United States Patent
Eng

(10) Patent No.: US 12,160,707 B2
(45) Date of Patent: Dec. 3, 2024

(54) SYSTEMS AND METHODS FOR HEARING ASSISTANCE

(71) Applicant: Comcast Cable Communications, LLC, Philadelphia, PA (US)

(72) Inventor: Adam Eng, Golden, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 64 days.

(21) Appl. No.: 17/302,998

(22) Filed: May 18, 2021

(65) Prior Publication Data

US 2022/0377468 A1    Nov. 24, 2022

(51) Int. Cl.
H04R 25/00    (2006.01)
G10L 25/78    (2013.01)

(52) U.S. Cl.
CPC ............ H04R 25/407 (2013.01); G10L 25/78 (2013.01); H04R 25/405 (2013.01); *H04R 2225/43* (2013.01)

(58) Field of Classification Search
CPC ...... H04R 25/40; H04R 25/43; H04R 25/405; H04R 25/407
See application file for complete search history.

(56) References Cited

U.S. PATENT DOCUMENTS

| | | | |
|---|---|---|---|
| 11,138,990 B1* | 10/2021 | McElhone | H04R 25/407 |
| 2021/0289300 A1* | 9/2021 | Tiefenau | G10L 21/028 |
| 2021/0385587 A1* | 12/2021 | Honda | H04R 1/406 |
| 2021/0400398 A1* | 12/2021 | McCutcheon | H04R 25/40 |
| 2022/0132252 A1* | 4/2022 | Pedersen | H04R 25/554 |

\* cited by examiner

*Primary Examiner* — Suhan Ni
(74) *Attorney, Agent, or Firm* — BakerHostetler

(57) ABSTRACT

Audio content captured by a plurality of microphones associated with a device, such as a hearing device, may be received. It may be determined that a first portion of the audio content is associated with a first microphone of the plurality of microphones. The first microphone may be a unidirectional microphone. Audio indicative of the first portion may be generated and sent to the device for output. It may be determined that a second portion of the audio content is associated with a second, different microphone of the plurality of microphones. The second microphone may be an omnidirectional microphone. Audio indicative of the second portion may be generated and sent to the device for output.

24 Claims, 9 Drawing Sheets

SYSTEMS AND METHODS FOR HEARING ASSISTANCE

BACKGROUND

Those who are hard of hearing experience a decreased quality of life. For example, those who are hard of hearing may have a difficult time conversing with friends and/or family members or may have a difficult time hearing the television. To improve one's hearing ability, a hearing aid may be used. However, users of hearing aids often still have difficulty hearing. Therefore, improvements in hearing aid technology are needed.

SUMMARY

Methods and systems are disclosed for hearing assistance. A hearing device may comprise a plurality of microphones. At least one of microphones of the plurality of microphones may be a unidirectional microphone. At least one of the other microphones of the plurality of microphones may be an omnidirectional microphone. Audio content captured by the unidirectional microphone may be less likely to comprise background noise and/or more likely to comprise audio content that the user of the hearing device wants or needs to be able to hear. Accordingly, output of the audio content captured via the unidirectional microphone(s) may be prioritized over the output of the audio content captured via the omnidirectional microphone(s). The hearing device may comprise a speaker for outputting audio content captured by the microphone(s). Alternatively, the hearing device may output, via the speaker, computer-generated reiterations of audio content captured by the microphone(s). By reiterating audio content captured by the microphone(s) using computer-generated voices, the audio content may be altered in a manner that is easier for the user of the hearing device to comprehend.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION OF ILLUSTRATIVE EMBODIMENTS

Figure 1B:
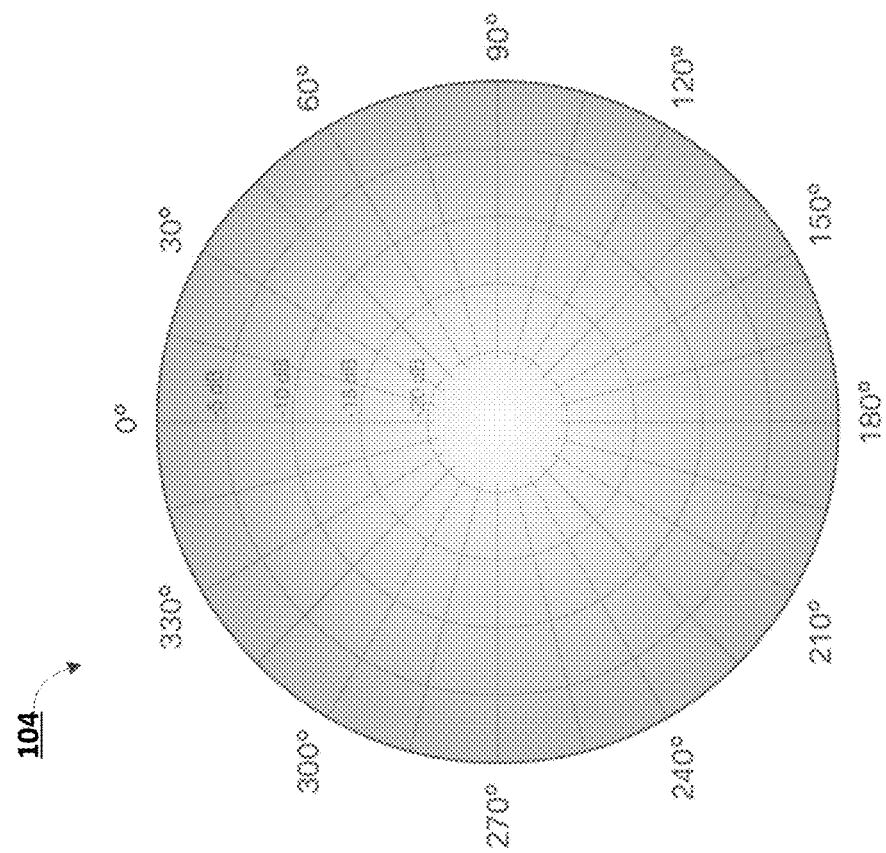
FIGS. 1a-b illustrates exemplary polar patterns associated with microphones.

For those that have hearing loss, hearing aids may be the best option to help correct untreated hearing loss and, therefore, to experience an improved quality of life. A variety of different types of hearing aids exist. For example, analog hearing aids are a common type of hearing aid. Analog hearing aids may have a microphone that captures audio content (e.g. sound) in the environment and converts it to an analog electrical signal. The analog electrical signal may then be amplified and/or shaped by transistors and/or circuits in a signal processing region (e.g. the amplifier) of the hearing aid. The amplified and/or shaped electrical signal may then be sent to the receiver (e.g. the speaker) to be changed back to an acoustic analog signal. The acoustic analog signal may then be output to the user of the hearing aid, such as via a speaker.

As another example, digital hearing aids are a common type of hearing aid. Digital hearing aids may also have a microphone that captures audio content (e.g. sound) in the environment and coverts it to an analog electrical signal. Unlike analog hearing aids, digital hearing aids may then apply filters to the electrical signal to remove inaudible frequencies. For example, digital hearing aids may apply a high-pass filter and/or a low-pass filter to the electrical signal. A high-pass filter may attenuate signals with frequencies lower than a pre-determined threshold. Similarly, a low-pass filters may attenuate signals with frequencies higher than a pre-determined threshold.

The thresholds for each of these filters may, for example, be selected by the user of the hearing aid, based on their hearing abilities. Additionally, or alternatively, the threshold for these filters may be predetermined, such as by a manufacturer of the hearing aids. Electrical signals that pass through the filter(s) may be converted to a digital signal. Amplification of the digital signal may be achieved using a computer chip in the digital hearing aid. A digital-to-analog converter may convert the digital signal back into an analog electrical signal, and the analog electrical signal may then be output to the user of the hearing aid, such as via a speaker.

However, each of these types of hearing aids have shortcomings. For example, analog hearing aids may amplify all audio content captured by the microphone. As a result, both speech and ambient noise captured by the microphone may be made louder together. As another example, even existing digital hearing aids—which may filter out some inaudible frequencies before amplification—still fail to eliminate or sufficiently reduce background noise. As a result, the user of a hearing aid, whether analog or digital, may have difficulty hearing an important sound. For example, the user of the hearing aid may have difficulty hearing their friends or family members speak to them in a noisy restaurant. As another example, the user of the hearing aid may have difficulty hearing the television if there is a lot of background noise.

Figure 1A:
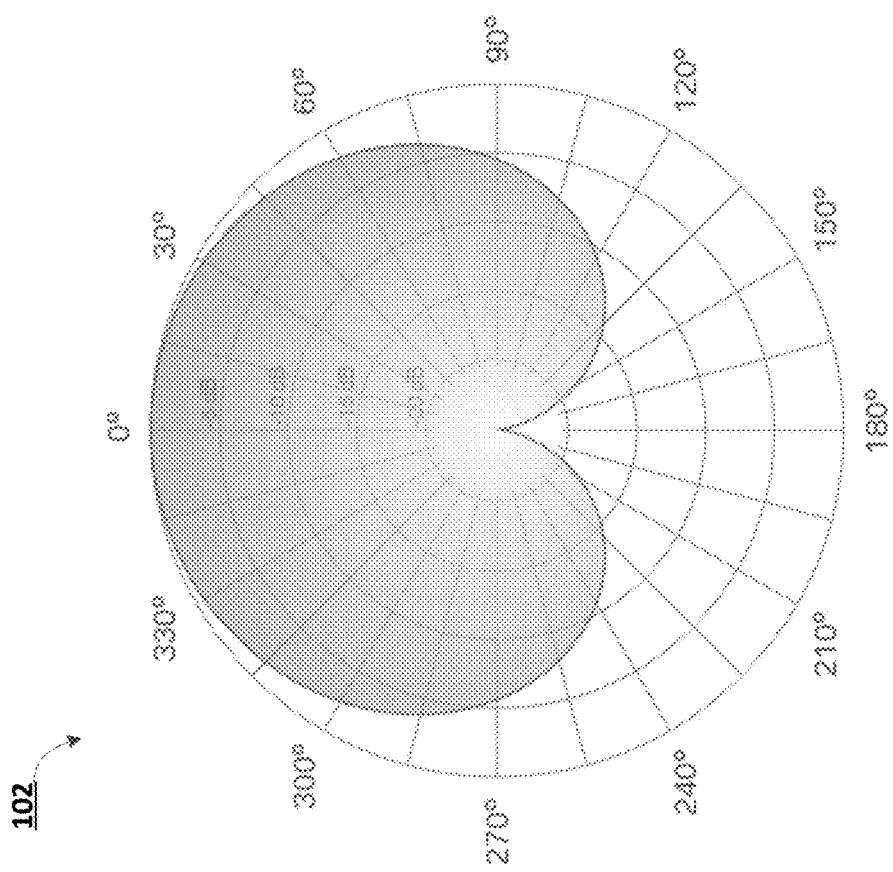

Accordingly, it may be desirable to develop a hearing aid that better eliminates background noise. A hearing aid may better eliminate background noise, and therefore improve the ability of the user to hear important sounds, if the hearing aid comprises more than one microphone. For example, a hearing aid may better eliminate background noise if the hearing aid comprises more than one different type of microphone. The more than one different type of microphone may comprise, for example, at least one unidirectional microphone and at least one omnidirectional microphone. FIGS. 1a-b illustrate exemplary polar patterns (e.g. pickup patterns) associated with different types of microphones, such as different types of microphones that may be included in a hearing aid. The polar pattern associated with a microphone indicates how much of an audio content (e.g. sound) signal will be picked up by the microphone from different directions and/or angles. For example, a polar pattern associated with a microphone may depict a 360° field surrounding the microphone, where 0° is the front of the microphone and the angle where the microphone has its maximum sensitivity. The scale of the circle may consist of smaller circles, each representing a decrease in sensitivity, such as a 5 dB decrease in sensitivity.

FIG. 1a illustrates a polar pattern 102 associated with a unidirectional microphone. A unidirectional microphone may be a microphone that picks up audio content with high gain (e.g. loudness) from a specific side and/or direction of the microphone. For example, if a person is speaking into a unidirectional microphone, the person must speak into the correct side (e.g. the front side), of the microphone in order for the microphone to pick up the speech with a high gain. A unidirectional microphone in a hearing aid may be a microphone that picks up audio content with high gain from the side and/or direction of the microphone that is in front of a user wearing the hearing aid. For example, a unidirectional microphone in a hearing aid may be a microphone that picks up audio content with a high gain from a speaker that is standing in front of the user of the hearing aid. The unidirectional microphone may not capture audio content from speaker standing behind the user of the hearing aid.

The polar pattern 102 depicts a 360° field surrounding a unidirectional microphone, where 0° is the front of the unidirectional microphone and the angle where the unidirectional microphone has its maximum sensitivity (e.g. picks up audio content with the highest gain). The polar pattern 102 illustrates that at an angle of 180°, the unidirectional microphone has no sensitivity (e.g. does not pick up any audio content). Accordingly, any audio content entering the microphone at a 180° angle will not be captured. The polar pattern 102 illustrates that at the remainder of the angles, such as at those angles between 0-180° and/or those between 180°-360°, the unidirectional microphone has less sensitivity than it does at 0° but more sensitivity than it does at 180°. For example, the polar pattern 102 illustrates that at an angle of 90°, the unidirectional microphone has a 5 dB decrease in sensitivity when compared to the 0° angle. Accordingly, audio content entering the unidirectional microphone at an angle of 90° will be picked up with less gain (e.g. loudness) than audio content entering the unidirectional microphone at an angle of 0°.

FIG. 1B illustrates a polar pattern 104 associated with an omnidirectional microphone. An omnidirectional microphone may be a microphone that picks up audio content with equal gain (e.g. loudness) from all sides and/or directions of the microphone, rather than just from a specific side and/or direction. For example, an omnidirectional microphone in a hearing aid may capture audio content coming from a speaker positioned in front of the user wearing the hearing aid with the same gain as audio content coming from a speaker positioned behind the user wearing the hearing aid.

The polar pattern 104 depicts a 360° field surrounding a omnidirectional microphone, where 0° is the front of the omnidirectional microphone and the angle where the omnidirectional microphone has equal sensitivity (e.g. picks up sound with the same gain) from all angles and/or directions. For example, the polar pattern 104 illustrates that even at an angle of 180°, the omnidirectional microphone has the same sensitivity as it does at an angle of 0°. The polar pattern 102 illustrates that at the remainder of the angles, such as at those angles between 0-180° and/or those between 180°-360°, the unidirectional microphone has the same sensitivity as it does at 0° and 180°. Accordingly, audio content entering the omnidirectional microphone at any angle, such as at an angle of 90°, will be picked up with the same gain (e.g. loudness) as audio content entering the omnidirectional microphone at an angle of 0°.

As discussed above, a hearing aid may better eliminate background noise, and therefore improve the ability of the user to hear important audio content, if the hearing aid comprises at least one unidirectional microphone and at least one omnidirectional microphone. Audio content captured by the hearing aid microphone(s) at an angle of 0° (e.g. from in front of the user wearing the hearing aid) may be less likely to comprise background noise. For example, audio content captured by the hearing aid microphone(s) at an angle of 0° may be more likely to comprise speech from an individual that the hearing aid user is conversing with. Conversely, audio content captured by the hearing aid microphone(s) at angles other than 0° may be more likely to comprise background noise. For example, audio content captured by the hearing aid microphone(s) at an angle of 180° (e.g. from behind the microphones(s)) may be unlikely to comprise speech from an individual that the hearing aid user is conversing with. Accordingly, it may be more important for the user of the hearing aid to hear audio content captured by the hearing aid microphone(s) at an angle of 0°.

Audio content captured by the hearing aid microphone(s) at an angle of 0° may be prioritized over audio content captured by the hearing aid microphone(s) at other angles and/or directions. Because unidirectional microphones primarily capture audio content at an angle of 0°, the audio content captured by the unidirectional microphone of the hearing aid may be prioritized over the audio content captured by the omnidirectional microphone (e.g. audio content more likely to comprise background noise).

Output of audio content captured by the unidirectional microphone may be prioritized over output of audio content captured by the omnidirectional microphone in a variety of different ways. For example, this prioritization may be accomplished by the hearing aid outputting, to the user, audio content captured by the unidirectional microphone before outputting audio content captured by the omnidirectional microphone. In this way, the user of the hearing aid will be able to hear the audio content captured by the unidirectional microphone without that audio content being overtaken by background noise. Once the hearing aid has output audio content captured by the unidirectional microphone, the hearing aid may then output other audio content, such as that captured by the omnidirectional microphone. For example, if the user of the hearing aid is in a coffee shop having a conversation with a friend, the hearing aid may first output audio content captured by the unidirectional microphone (e.g. the conversation with the friend). After the conversation has ended, or taken a pause, the hearing aid may then output audio content captured by the omnidirectional microphone (e.g. the background music and/or chatter in the coffee shop).

The prioritization may additionally, or alternatively, be accomplished by the hearing aid outputting, to the user, audio content captured by the unidirectional microphone at a different volume than audio content captured by the omnidirectional microphone. For example, the hearing aid may output audio content captured by the unidirectional microphone at a higher volume than audio content captured by the omnidirectional microphone. In this way, the audio content captured by both the unidirectional microphone and the omnidirectional microphone may be simultaneously output, but the user will still be able to hear the audio content captured by the unidirectional microphone without that audio content being overtaken by background noise. A hearing aid comprising both a unidirectional microphone and an omnidirectional microphone is depicted in more detail below, with reference to FIG. 2. These techniques for prioritizing the output of audio content captured by a unidirectional microphone of a hearing aid are discussed in more detail below, with reference to methods 400-600 of FIGS. 4-6.

In addition to, or as an alternative to, developing a hearing aid that better eliminates background noise, it may be desirable to develop a hearing aid that outputs audio in a manner that is easier for the user of the hearing aid to comprehend. For example, rather than just blindly amplifying audio content, as existing hearing aids do, it may be desirable to analyze audio content captured by the microphone(s) of the hearing aid and to reiterate (e.g. repeat) it (or portions of it) in a manner that is easier for the user of the hearing aid to comprehend. Reiterating audio content captured by the microphone(s) of the hearing aid in a manner that is easier for the user of the hearing aid to comprehend may comprise, for example, reiterating audio content captured by the microphone(s) of the hearing aid with an altered tone and/or frequency. Those who are hard of hearing may have an easier time comprehending audio content, such as speech, associated with a certain tone and/or frequency. Accordingly, the audio content captured by the microphone(s) of the hearing aid may be reiterated at a higher or lower tone and/or frequency, at any intensity deemed to be desirable by the user.

As another example, reiterating audio content captured by the microphone(s) of the hearing aid in a manner that is easier for the user of the hearing aid to comprehend may comprise reiterating audio content captured by the microphone(s) of the hearing aid at an altered speed. Those who are hard of hearing may have an easier time comprehending an individual that is speaking if that individual speaks slowly. Accordingly, the audio content captured by the microphone(s) of the hearing aid may be reiterated at a reduced speed, at any intensity deemed to be desirable by the user. Additionally, or alternatively, the audio content captured by the microphone(s) of the hearing aid may not be output to the user if the rate of speech does not satisfy a threshold. For example, the threshold may be determined by the user, and may indicate a rate of speech deemed to be desirable by the user. Audio content captured by the microphone(s) of the hearing aid may not satisfy the threshold if the audio content is associated with a rate of speech that is not desirable to the user (e.g. too fast to comprehend).

As another example, reiterating audio content captured by the microphone(s) of the hearing aid in a manner that is easier for the user of the hearing aid to comprehend may comprise replacing particular words, terms, or phrases in captured speech with different words, terms, or phrases. Those who are hard of hearing are often elderly and may have difficulty understanding the jargon used by younger generations. Accordingly, if the audio content captured by the microphone(s) of the hearing aid are reiterated, certain words, terms, or phrases associated with the captured audio content may be replaced with easier to comprehend (e.g. more age-appropriate) terms. For example, the word "PlayStation 5" may be replaced with "Nintendo" or "video game console."

To reiterate audio content captured by a microphone of the hearing aid, a computer-generated voice may be selected and/or generated for the reiteration of the audio content. For example, if a microphone of the hearing aid captures speech, a computer-generated voice that reiterates that speech may be selected and/or generated. The computer-generated voice may be selected and/or generated, at least in part, on voice patterns associated with the individual's original voice. By selecting and/or generating a computer-generated voice based at least on voice patterns associated with the individual's original voice, the user of the hearing aid may be able to differentiate between different voices. For example, the user of the hearing aid may be able to differentiate between his or her 6-year old great granddaughter speaking to them and his or her spouse speaking to them. For example, a child speaker may be associated with a different voice frequency than an adult speaker. Accordingly, the computer-generated voice selected and/or generated to reiterate speech associated with a child speaker may have a different frequency than a computer-generated voice selected and/or generated to reiterate speech associated with an adult speaker. Likewise, different genders may be associated with different voice frequencies, and the selected and/or generated computer-generated voices may reflect these differences.

In addition to, or as an alternative to voice frequency, the voice patterns associated with the original voice may indicate a cadence, accent, or timbre associated with the original voice. A computer-generated voice having at least one of a similar cadence, accent, or timbre may be selected and/or generated to reiterate the speech. For example, two speakers of the same age and/or gender may be associated with similar voice frequencies, but still may sound different than each other. In order to select and/or generate computer-generated voices for these two different speakers, at least one of their cadences, accents, or timbres may be used to select and/or generate two different computer-generated voices.

Conversely, existing hearing devices that simply output speech captured by the microphone(s) instead of outputting a computer-generated reiteration of that speech, may not be able to be alter the output speech as extensively as a computer-generated reiteration may be able to be altered. For example, if a hearing device were to simply output speech captured by the microphone(s) instead of outputting a computer-generated reiteration of that speech, the volume of the speech may be able to be amplified, such as via an amplifier. However, other features of the speech, including but not limited to tone and/or frequency, word speed, or diction, may be unalterable. Accordingly, using computer-generated voices to reiterate speech captured by the microphone(s) of a hearing device improves the performance of the hearing device—thereby improving the quality of life of the user of the hearing device.

A hearing aid, such as the hearing aid described below with reference FIG. 2, may select and/or generate the computer-generated voices itself. Additionally, or alternatively, the hearing aid may be in communication with a remote device responsible for selecting and/or generating the computer-generated voices. If the hearing aid is in communication with a remote device responsible for selecting and/or generating the computer-generated voices, the remote device may forward, to the hearing aid for output, the computer-generated voices.

The computer-generated voices may be selected from pre-programmed voices, such as those stored in a database accessible by the hearing aid and/or the remote device responsible for selecting and/or generating the computer-generated voices. Additionally, or alternatively, the computer-generated voices may be generated utilizing, at least in part, deep fake technology. Deep fakes are fake videos or audio recordings that look and sound just like the real thing. For example, a deep fake may be a video or audio recording that looks and/or sounds just like a celebrity—but is not actually that celebrity. To create deep fakes, two machine learning (ML) models may be utilized. A first ML model may be trained on a data set and then be used to create video and/or audio forgeries, while the other ML model attempts to detect the forgeries. The first ML model creates fakes until the other ML model can no longer detect the forgery. The larger the set of training data, the easier it is for the first ML model to create a believable deep fake.

If the computer-generated voices are generated utilizing, at least in part, deep fake technology, the computer-generated voice associated with a speaker may improve (e.g. sound more like the speaker) each time the hearing aid microphone(s) capture this speaker's voice. A first ML model may be trained on a data set, which may include voice data captured by the hearing aid microphone(s). If this is the first time that voice data associated with the speaker has been captured by the hearing aid microphone(s), the training set may be small, and the first ML model may not be able to create a believable "fake" voice. Rather, the first ML model may select a generic female or male voice to be the first computer-generated iteration "deep fake" of the speaker's voice (depending on the gender of the original speaker). The second ML model may be able to easily detect that the first computer-generated iteration is indeed a "fake" voice.

As words from this speaker continue to be captured by the hearing aid microphone(s), such as over the course of days, weeks, months, years, or any other time period, the training set on which the first ML model is trained may be increased. As the trainings set grows large enough, the first ML model may be able to generate a "fake" computer-generated voice that sounds more and more like the original speaker. Eventually, enough voice data associated with the speaker may be captured so that the computer-generated voice sounds nearly or almost identical to the original speaker's voice. For example, the second ML model may no longer be able to detect that the computer-generated voice is a "fake" voice.

This utilization of deep fake technology may be particularly helpful when generating computer-generated voices for speakers that the user of the hearing aid interacts with frequently. For example, the user of the hearing aid may frequently interact with and converse with a particular friend or family member, such as his or her spouse. Due to this frequent interaction, enough voice data associated with this speaker may eventually be captured so that later iterations of the computer-generated voice sound nearly or almost identical to the speaker's original voice. This deep fake technology may be utilized only for a portion of speech captured by the microphone(s) of the hearing aid (such as speech associated with individuals who frequently interact with the user of the hearing aid), whereas other speech and/or audio content captured by the microphone(s) of the hearing aid may be generated using other techniques, such as by selecting a pre-programmed voice from a database.

The computer-generated voices may be configured to reiterate speech and/or other audio content captured by the microphone(s) of the hearing aid. For example, the speech and/or other audio content captured by the microphone(s) of the hearing aid may be converted to text. The text may then be read by the computer-generated voice, and this reiteration of the speech may be output by the hearing aid, such as via a speaker. The techniques for selecting and/or generating a computer-generated voice based on voice patterns are discussed in more detail below, with reference to methods 700-800 of FIGS. 7-8.

Figure 2:
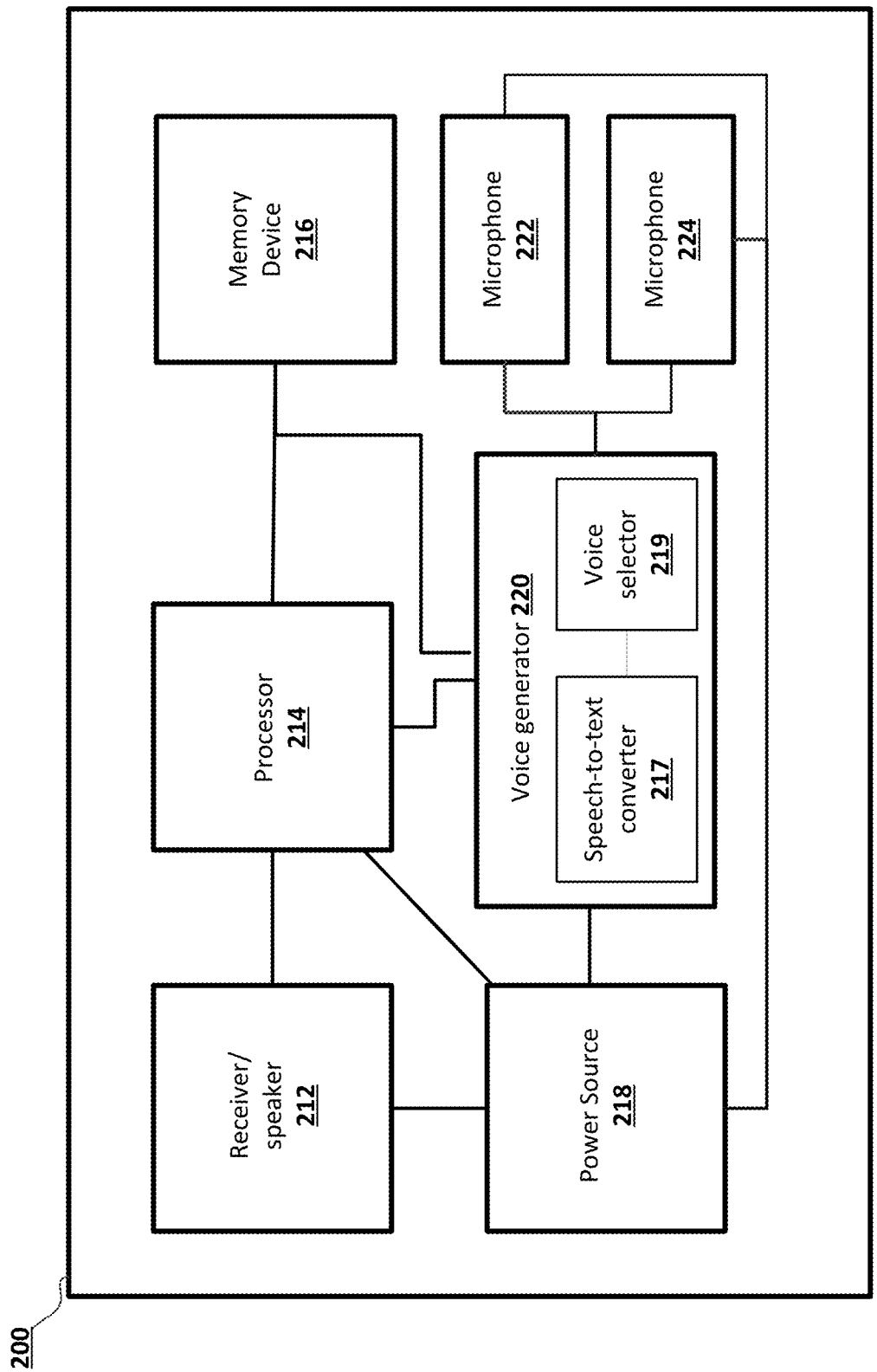
FIG. 2 illustrates an example hearing device.

FIG. 2 illustrates an exemplary hearing device 200, such as a hearing aid. The hearing device 200 may be worn, in one or both ears, by a user. The user may be experiencing hearing loss and may wear the hearing device 200 to improve his or her ability to hear. The hearing device 200 may be configured to eliminate background noise, such as in the manner described above. For example, the hearing device 200 may be configured to prioritize the output of audio content captured by a unidirectional microphone of the hearing device 200 rather than the audio content captured by an omnidirectional microphone of the hearing device 200. The hearing device 200 may additionally, or alternatively, be configured to output audio content in a manner that is easier for the user of the hearing aid to comprehend, such as in the manner described above. For example, the hearing device 200 may be configured to output audio content at one or more of a louder volume, a different frequency and/or tone, a different speed, or with word replacements. The hearing device 200 may be configured to both eliminate background noise, such as by prioritizing the output of audio content captured by a unidirectional microphone of the hearing device 200, and output audio content in a manner that is easier for the user of the hearing aid to comprehend.

Many different styles of hearing aids exist. The hearing device 200 may be any one of a variety of these different hearing aid styles. For example, the hearing device 200 may be a completely-in-the-canal (CIC) hearing aid. A CIC hearing aid is a hearing aid that is molded to fit inside the user's ear canal and may be used to improve mild to moderate hearing loss. Alternatively, the hearing device 200 may be an in-the-canal (ITC) hearing aid. An ITC hearing aid may be molded to fit partially in the user's ear canal and may also be used to improve mild to moderate hearing loss. Alternatively, the hearing device 200 may be an in-the-ear (ITE) hearing aid. An ITE hearing aid may be molded to fill most of the bowl-shaped area of the user's outer ear, or an ITE hearing aid may be molded to fill only the lower part of the user's ear. An ITE hearing aid may be used to improve mild to severe hearing loss. Alternatively, the hearing device 200 may be a behind-the-ear (BTE) hearing aid. A BTE hearing aid may hook over the top of the user's ear and rest behind the ear. A tube may connect the hearing aid to a customer earpiece called an ear mold that fits in your ear canal. A BTE hearing aid may be used to improve almost any type of hearing loss. Alternatively, the hearing device 200 may be a receiver-in-canal (MC) hearing aid or a receiver-in-the-ear (RITE) hearing aid. A MC or RITE hearing aid is similar to a BTE hearing aid, but a wire (rather than a tube) may connect the piece behind the ear to the speaker/receiver. Alternatively, the hearing device 200 may be an open-fit hearing aid. An open-fit hearing aid may be a variation of the BIT hearing aid with a thin tube or the receiver-in-the-canal or receiver-in-the-ear hearing aid with an open dome in the ear. The open-fit hearing aid may be used to improve mild to moderate hearing loss.

The hearing device 200 may comprise a first microphone 222. The first microphone 222 may be, for example, a unidirectional microphone. As described above with reference to FIG. 1*a*, a unidirectional microphone may be a microphone that picks up audio content (e.g. sound) with high gain (e.g. loudness) from a specific side and/or direction of the microphone. For example, if a person is speaking into a unidirectional microphone, the person must speak into the correct side (e.g. the front side), of the microphone in order for the microphone to pick up the speech with a high gain. If the microphone 222 is a unidirectional microphone, the microphone 222 may pick up audio content with high gain from the side and/or direction of the microphone that is in front of a user wearing the hearing device 200. For example, if the microphone 222 is a unidirectional microphone, the microphone 222 may pick up audio content with a high gain from a speaker that is standing in front of the user of the hearing device 200. The unidirectional microphone may not capture audio content from speaker standing behind the user of the hearing device 200.

The hearing device 200 may additionally, or alternatively, comprise a second microphone 224. The second microphone 224 may be a different type of microphone than the first microphone 222. For example, the second microphone 224 may be an omnidirectional microphone. As described above with reference to FIG. 1B, an omnidirectional microphone may be a microphone that picks up audio content with equal gain (e.g. loudness) from all sides and/or directions of the microphone, rather than just from a specific side and/or direction. If the microphone 224 is an omnidirectional microphone, the microphone 224 may capture audio content coming from a speaker positioned in front of the user wearing the hearing device 200 with the same gain as audio content coming from a speaker positioned behind the user wearing the hearing device 200.

The hearing device 200 may comprise a receiver/speaker 212. The receiver/speaker 212 may output audio content captured by the microphone 222 and/or the microphone 224 to the user of the hearing device 200. The hearing device 200 may be configured to prioritize the output of audio content captured by a specific microphone, such as the microphone 222. By prioritizing the output of audio content captured by a specific microphone, such as the microphone 222, the hearing device 200 may eliminate or reduce the output of background noise to the user of the hearing device 200. For example, the hearing device 200 may be configured to prioritize the output of audio content that is less likely to comprise background noise.

As described above, audio content captured by a microphone at an angle of 0° (as shown in FIGS. 1a-b) may be more likely to comprise speech from an individual that a user of the hearing device is conversing with as opposed to background noise. Accordingly, it may be more important for the user of the hearing device 200 to hear audio content captured by the hearing aid microphone(s) at an angle of 0° than audio content captured by the hearing aid microphone(s) at other angles and/or directions. As unidirectional microphones primarily capture audio content at an angle of 0°, if the microphone 222 is a unidirectional microphone, the microphone 222 may primarily capture audio content at an angle of 0°. Accordingly, if the microphone 222 is a unidirectional microphone, the sound captured by the microphone 222 may be prioritized over the audio content captured by other microphones of the hearing device 200, such as the microphone 224 (e.g. an omnidirectional microphone).

Output of audio content captured by the microphone 222 may be prioritized over output of audio content captured by the microphone 224 in a variety of different ways. For example, this prioritization may be accomplished by the receiver/speaker 212 outputting, to the user, audio content captured by the microphone 222 before outputting audio content captured by the microphone 224. In this way, the user of the hearing device 200 will be able to hear the audio content captured by the microphone 222 without those sounds being overtaken by background noise, such as background noise that may be captured by the microphone 224. Once the receiver/speaker 212 has output audio content captured by the microphone 222, the receiver/speaker 212 may then output other audio content more likely to comprise background noise, such as that captured by the microphone 224. For example, if the user of the hearing device 200 is in a coffee shop having a conversation with a friend, the receiver/speaker 212 may first output audio content captured by the microphone 222 (e.g. the conversation with the friend). After the conversation has ended, or taken a pause, the receiver/speaker 212 may then output audio content captured by the microphone 224 (e.g. audio content more likely to comprise the background music and/or chatter in the coffee shop).

The prioritization may additionally, or alternatively, be accomplished by the receiver/speaker 212 outputting, to the user, audio content captured by the microphone 222 at a different volume than audio content captured by the microphone 224. For example, the receiver/speaker 212 may output audio content captured by the microphone 222 at a higher volume than audio content captured by the microphone 224. In this way, the audio content captured by both the microphone 222 and the microphone 224 may be simultaneously output, but the user will still be able to hear the audio content captured by the microphone 222 without that audio content being overtaken by background noise. These techniques for prioritizing the output of audio content captured by a unidirectional microphone of a hearing aid are discussed in more detail below, with reference to methods 400-600 of FIGS. 4-6.

Instead of, or in addition to, the receiver/speaker 212 outputting audio content captured by the microphone 222 and/or the microphone 224, the receiver/speaker 212 may output reiterations of the audio content captured by the microphone 222 and/or the microphone 224 to the user of the hearing device 200. The hearing device 200 may comprise a voice generator 220. The voice generator 220 may be configured to generate computer-generated reiterations of audio content, such as speech, captured by the microphone 222 and/or the microphone 224. The voice generator 220 may comprise a speech-to-text converter 217. The speech-to-text converter 217 may convert speech captured by the microphone 222 and/or the microphone 224 into text. Any known speech-to-text software may be utilized by the speech-to-text converter 217 to convert speech captured by the microphone 222 and/or the microphone 224 into text.

The text generated by the speech-to-text converter 217 may be reiterated by a computer-generated voice. The computer-generated voice chosen to reiterate the text may be dependent, at least in part, on the voice patterns associated with the original voice associated with the speech (e.g. the voice of the individual that spoke). The voice generator 220 may comprise a voice selector 219. The voice selector 219 may be configured to select a computer-generated voice to reiterate speech, based at least in part on voice patterns associated with the original voice. Selecting a computer-generated voice based at least on voice patterns associated with the original speech may allow the user of the hearing device 200 to differentiate between different speakers. For example, the user of the hearing device 200 may be able to differentiate between the voice of his or her 6-year old great granddaughter and the voice of his or her spouse.

For example, the voice selector 219 may use, at least in part, the frequency of the original voice to select a computer-generated voice for the reiteration. As described above, a child speaker may be associated with a different voice frequency (e.g. a higher frequency) than an adult speaker. Accordingly, the computer-generated voice selected and/or generated to reiterate speech associated with a child speaker may have a different frequency (e.g. a higher frequency) than a computer-generated voice selected to reiterate speech associated with an adult speaker. Likewise, different genders may be associated with different voice frequencies. For example, a female speaker may be associated with a higher voice frequency than a male speaker. The voice selector 219 may analyze the frequency of the original voice to select an appropriate computer-generated voice for the reiteration.

In addition to, or as an alternative to voice frequency, the voice selector 219 may use other voice patterns associated with the original voice to select a computer-generated voice for the reiteration. For example, the voice selector 219 may use one or more of a cadence, accent, or timbre associated with the original voice to select a computer-generated voice for the reiteration. For example, two speakers of the same age and/or gender may be associated with similar voice frequencies, but still may sound different than each other. In order to select different computer-generated voices for these two different voices, at least one of the voices' cadences, accents, or timbres may be used, in addition to their voice frequencies, to select and/or generate two different computer-generated voices. The voice selector 219 may select the computer-generated voice for reiteration from a variety of pre-programmed voices, such as those stored in a memory device 216 of the hearing device 200.

The hearing device 200 may comprise a processor 214. The processor 214 may be configured to alter audio content, such as the sounds captured by the microphone(s) 222, 224 and/or the reiterations selected and/or generated by the voice generator 220, before the audio content is output by the receiver/speaker 212. The processor 214 may be configured to alter the audio content before output by the receiver/speaker 212 in a variety of different ways so that the audio content may be output in a manner that is easier for the user of the hearing device 200 to comprehend. For example, the processor 214 may be configured to alter the volume of audio content before output by the receiver/speaker 212. The processor 214 may alter the volume of audio content before output by the receiver/speaker 212 by either lowering or raising the volume. As described above, output of audio content captured by the microphone 222 may be prioritized over output of audio content captured by the microphone 224. This prioritization may be accomplished by outputting audio content captured by the microphone 222 at a higher volume than audio content captured by the microphone 224. The processor 214 may be responsible for altering the volume of audio content captured by the microphone 222 to be higher, and/or altering the volume of audio content captured by the microphone 224 to be lower. The receiver/speaker 212 may simultaneously output the altered audio content captured by the microphone 222 and the microphone 224.

In addition to, or as an alternative to, altering the volume of audio content before output by the receiver/speaker 212, the processor 214 may alter audio content in other ways. For example, the processor 214 may alter the tone and/or frequency associated with audio content before output by the receiver/speaker 212. Those who are hard of hearing may have an easier time comprehending audio content, such as speech, associated with a certain tone and/or frequency. Accordingly, the processor 214 may alter audio content so that it may be output by the receiver/speaker 212 at a higher or lower tone and/or frequency, at any intensity deemed to be desirable by the user of the hearing device 200.

As another example, the processor 214 may alter the speed of audio content before output by the receiver/speaker 212. Those who are hard of hearing may have an easier time comprehending an individual that is speaking if that individual speaks slowly. Accordingly, the processor 214 may alter audio content so that they are reiterated a reduced speed, at any intensity deemed to be desirable by the user of the hearing device 200. Additionally, or alternatively, the processor 214 may filter out audio content that does not satisfy a threshold, and this audio content may not be output by the receiver/speaker 212. For example, the threshold may be determined by the user, and may indicate a rate of speech deemed to be desirable by the user. Audio content captured by the microphone(s) of the hearing aid may not satisfy the threshold if the audio content is associated with a rate of speech that is not desirable to the user (e.g. too fast to comprehend).

As another example, the processor 214 may replace particular words, terms, or phrases in captured audio content with different words, terms, or phrases before output by the receiver/speaker 212. Those who are hard of hearing are often elderly and may have difficulty understanding the jargon used by younger generations. Accordingly, the processor 214 may, in a reiteration of speech, replace certain words, terms, or phrases found in the original speech with words, terms, or phrases that may be easier to comprehend (e.g. more age-appropriate) terms. For example, the processor 214 may replace the word "PlayStation 5" with "Nintendo" or "video game console."

The hearing device 200 may comprise a power source 218. The power source 218 may, for example, comprise a battery. If the power source 218 comprises a battery, the power source 218 may comprise a rechargeable battery. If the power source 218 comprises a rechargeable battery, this may make maintenance of the hearing device 200 easier by eliminating the need to regularly change the battery. The power source 218 may alternatively, for example, comprise a disposable battery. The power source 218 may supply power to one or more of the components of the hearing device 200, such as one or more of the processor 214, the voice generator 220, the microphone(s) 222, 224, the receiver/speaker 212, or the memory device 216.

Figure 3:
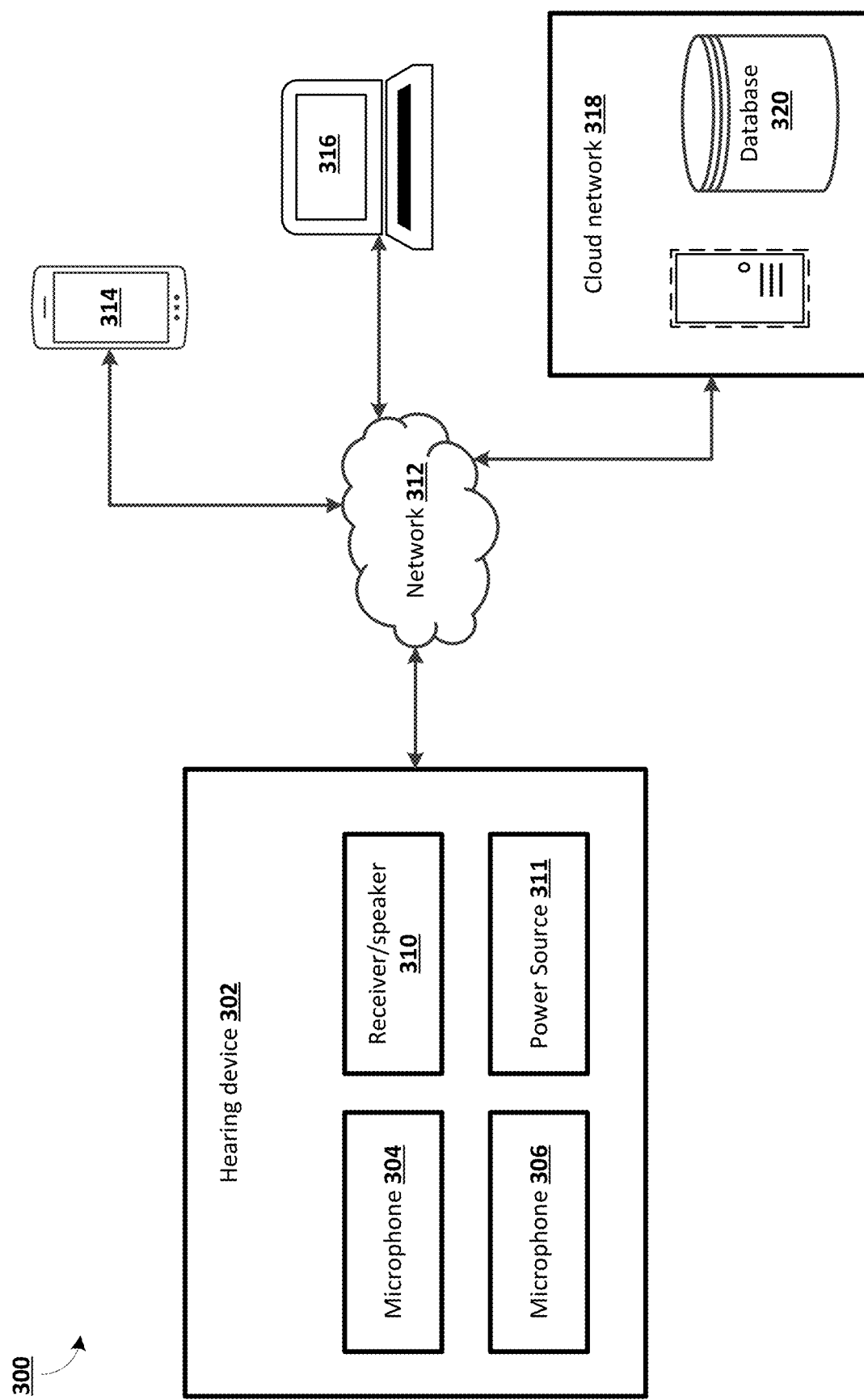
FIG. 3 illustrates an example system.

The hearing device 200 described above may select and/or generate the computer-generated voices for reiteration itself, such as via the voice generator 220. Additionally, or alternatively, a hearing device may be in communication with a remote device responsible for selecting and/or generating the computer-generated voices. For example, a hearing device may have wireless connectivity features that allow it to communicate with the remote device responsible for selecting and/or generating the computer-generated voices. If the hearing aid is in communication with a remote device responsible for selecting and/or generating the computer-generated voices, the remote device may forward, to the hearing aid for output, the computer-generated reiterations of the original speech. FIG. 3 illustrates a communications network 300 for selecting and/or generating computer-generated voices for a hearing device 302 at a remote device, such as at one or more of the devices 314, 316. Such a communications network 300 may comprise the hearing device 302, one or more remote devices 314, 316, and/or a cloud network 318.

Many different styles of hearing aids exist. The hearing device 302 may be any one of a variety of these different hearing aid styles. For example, the hearing device 302 may be a completely-in-the-canal (CIC) hearing aid. A CIC hearing aid is a hearing aid that is molded to fit inside the user's ear canal and may be used to improve mild to moderate hearing loss. Alternatively, the hearing device 302 may be an in-the-canal (ITC) hearing aid. An ITC hearing aid may be molded to fit partially in the user's ear canal and may also be used to improve mild to moderate hearing loss. Alternatively, the hearing device 302 may be an in-the-ear (ITE) hearing aid. An ITE hearing aid may be molded to fill most of the bowl-shaped area of the user's outer ear, or an ITE hearing aid may be molded to fill only the lower part of the user's ear. An ITE hearing aid may be used to improve mild to severe hearing loss. Alternatively, the hearing device 302 may be a behind-the-ear (BTE) hearing aid. A BTE hearing aid may hook over the top of the user's ear and rest behind the ear. A tube may connect the hearing aid to a customer earpiece called an ear mold that fits in your ear canal. A BTE hearing aid may be used to improve almost any type of hearing loss. Alternatively, the hearing device 302 may be a receiver-in-canal (MC) hearing aid or a receiver-in-the-ear (RITE) hearing aid. A MC or RITE hearing aid is similar to a BTE hearing aid, but a wire (rather than a tube) may connect the piece behind the ear to the speaker/receiver. Alternatively, the hearing device 302 may be an open-fit hearing aid. An open-fit hearing aid may be a variation of the BIT hearing aid with a thin tube or the receiver-in-the-canal or receiver-in-the-ear hearing aid with an open dome in the ear. The open-fit hearing aid may be used to improve mild to moderate hearing loss.

The hearing device 302 may be similar to or the same as the hearing device 200 depicted in FIG. 2. The hearing device 302 may comprise a plurality of microphones, such as a microphone 304 and a microphone 306. The microphones 304, 306 may be different types of microphones. For example, the microphone 304 may be a unidirectional microphone and the microphone 306 may be an omnidirectional microphone. As discussed above, a unidirectional microphone may be a microphone that picks up audio content with high gain (e.g. loudness) from a specific side and/or direction of the microphone. For example, if a person is speaking into a unidirectional microphone, the person must speak into the correct side (e.g. the front side), of the microphone in order for the microphone to pick up the speech with a high gain. If the microphone 304 is a unidirectional microphone, the microphone 304 may pick up audio content with high gain from the side and/or direction of the microphone that is in front of a user wearing the hearing device 302. For example, if the microphone 304 is a unidirectional microphone, the microphone 304 may pick up audio content with a high gain from a speaker that is standing in front of the user of the hearing device 302. The microphone 304 may not capture audio content from a speaker standing behind the user of the hearing device 302.

As also described above, an omnidirectional microphone may be a microphone that picks up audio content with equal gain (e.g. loudness) from all sides and/or directions of the microphone, rather than just from a specific side and/or direction. If the microphone 306 is an omnidirectional microphone, the microphone 306 may capture audio content coming from a speaker positioned in front of the user wearing the hearing device 302 with the same gain as audio content coming from a speaker positioned behind the user wearing the hearing device 302.

The hearing device 302 may comprise a receiver/speaker 310. The receiver/speaker 310 may output audio content captured by the microphone 304 and/or the microphone 306 to the user of the hearing device 302. The hearing device 302 may be configured to prioritize the output of audio content captured by a specific microphone, such as the microphone 304. By prioritizing the output of audio content captured by a specific microphone, such as the microphone 304, the hearing device 302 may eliminate or reduce the output of background noise to the user of the hearing device 302. For example, the hearing device 302 may be configured to prioritize the output of audio content that is less likely to comprise background noise.

Output of audio content captured by the microphone 304 may be prioritized over output of audio content captured by the microphone 306 in a variety of different ways. For example, this prioritization may be accomplished by the receiver/speaker 310 outputting, to the user, audio content captured by the microphone 304 before outputting sounds captured by the microphone 306. In this way, the user of the hearing device 302 will be able to hear the audio content captured by the microphone 304 without the audio content being overtaken by background noise, such as background noise that may be captured by the microphone 306. Once the receiver/speaker 310 has output audio content captured by the microphone 304, the receiver/speaker 310 may then output other audio content more likely to comprise background noise, such as that captured by the microphone 306. For example, if the user of the hearing device 302 is in a coffee shop having a conversation with a friend, the receiver/speaker 310 may first output audio content captured by the microphone 304 (e.g. the conversation with the friend). After the conversation has ended, or taken a pause, the receiver/speaker 310 may then output audio content captured by the microphone 306 (e.g. audio content comprising the background music and/or chatter in the coffee shop).

The prioritization may additionally, or alternatively, be accomplished by the receiver/speaker 310 outputting, to the user, audio content captured by the microphone 304 at a different volume than audio content captured by the microphone 306. For example, the receiver/speaker 310 may output audio content captured by the microphone 304 at a higher volume than audio content captured by the microphone 306. In this way, the audio content captured by both the microphone 304 and the microphone 306 may be simultaneously output, but the user will still be able to hear the audio content captured by the microphone 304 without the audio content being overtaken by background noise. These techniques for prioritizing the output of audio content captured by a unidirectional microphone of a hearing aid are discussed in more detail below, with reference to methods 400-600 of FIGS. 4-6.

The hearing device 302 may comprise a power source 311. The power source 311 may, for example, comprise a battery. If the power source 311 comprises a battery, the power source 311 may comprise a rechargeable battery. If the power source 311 comprises a rechargeable battery, this may make maintenance of the hearing device 302 easier by eliminating the need to regularly change the battery. The power source 311 may alternatively, for example, comprise a disposable battery. The power source 311 may supply power to one or more of the components of the hearing device 302, such as one or more of the microphones 304, 306 and/or the receiver/speaker 310.

The hearing device 302 may be in communication with one or more remote devices 314, 316 via a network 312. The network 312 may comprise a local area network, a wide area network, a wireless network, a wired network, the Internet, a combination thereof, or any other type of network over which the components of the communications network 300 may communicate. The network 312 may comprise one or more public networks (e.g., the Internet) and/or one or more private networks. A private network may include a wireless local area network (WLAN), a local area network (LAN), a wide area network (WAN), a cellular network, or an intranet. The network 312 may comprise wired network(s) and/or wireless network(s).

As described above with respect to FIG. 2, a hearing device, such as the hearing device 200, may select and/or generate the computer-generated voices for reiteration itself. These computer-generated voices may then be output by a speaker of the hearing device. Additionally, or alternatively, a hearing device, such as the hearing device 302, may be in communication with one or more remote devices, such devices 314, 316, that are configured to select and/or generate the computer-generated voices. The computer-generated voices selected and/or generated by the remote device(s) may then be forwarded to the hearing device for output, such as via a speaker associated with the hearing device. By utilizing a remote device for selection and/or generation of the computer-generated voices, the quantity of available CPUs, storage, and RAM may increase, as the remote device may be significantly larger than a hearing device and the remote device may not necessarily have to be battery-powered.

The remote devices 314, 316 may be any type of computing device, such as a computing device described below with reference to FIG. 9. For example, each of the remote devices 314, 316 may be a smartphone, server computer, workstation, gateway, tablet computer, laptop computer, notebook computer, desktop computer, personal computer, network appliance, PDA, e-reader, user equipment (UE), mobile station, fixed or mobile subscriber unit, pager, wireless sensor, consumer electronics, or another computing device.

The remote devices 314, 316 may be configured to perform tasks similar to the tasks performed by the processor 214 and/or the voice generator 220 described above with respect to FIG. 2. However, unlike the processor 214 and the voice generator 220 (which are components of hearing device 200), the remote devices 314, 316 may not be components of the hearing device 302. Accordingly, by utilizing the remote devices 314, 316 rather than a local processor, the quantity of available CPUs, storage, and RAM may be increased.

For example, the remote devices 314, 316 may be configured to select and/or generate computer-generated voices for reiterating sounds captured by the microphone(s) 304, 306. To select and/or generate computer-generated voices for reiterating sounds captured by the microphone(s) 304, 306, remote devices 314, 316 may convert speech captured by the microphone 304 and/or the microphone 306 into text. Any known speech-to-text software may be utilized by the remote devices 314, 316 to convert speech captured by the microphone 304 and/or the microphone 306 into text. The text may be reiterated by a computer-generated voice. The computer-generated voice chosen to reiterate the text may be dependent, at least in part, on the voice patterns associated with the speaker of the original speech.

The remote devices 314, 316 may be configured to select a computer-generated voice to reiterate speech, based at least in part on voice patterns associated with the original voice. Selecting a computer-generated voice based at least on voice patterns associated with the original voice may allow the user of the hearing device 302 to differentiate between different speakers. For example, the user of the hearing device 302 may be able to differentiate between the voice of his or her 6-year old great granddaughter and the voice of his or her spouse.

For example, the remote devices 314, 316 may use, at least in part, the frequency of the original voice to select a computer-generated voice for the reiteration. As described above, a child's voice may be associated with a different voice frequency (e.g. a higher frequency) than an adult's voice. Accordingly, the computer-generated voice selected and/or generated to reiterate speech associated with a child speaker may have a different frequency (e.g. a higher frequency) than a computer-generated voice selected to reiterate speech associated with an adult speaker. Likewise, different genders may be associated with different voice frequencies. For example, a female speaker may be associated with a higher voice frequency than a male speaker. The remote devices 314, 316 may analyze the frequency of the original voice to select an appropriate computer-generated voice for the reiteration.

In addition to, or as an alternative to voice frequency, the remote devices 314, 316 may use other voice patterns associated with the original voice to select a computer-generated voice for the reiteration. For example, the remote devices 314, 316 may use one or more of a cadence, accent, or timbre associated with the original voice to select a computer-generated voice for the reiteration. For example, two speakers of the same age and/or gender may be associated with similar voice frequencies, but still may sound different than each other. In order to select different computer-generated voices for these two different speakers, at least one of their cadences, accents, or timbres may be used, in addition to their voice frequencies, to select and/or generate two different computer-generated voices. The remote devices 314, 316 may select the computer-generated voice for reiteration from a variety of pre-programmed voices, such as those stored in a memory device accessible by the remote devices 314, 316.

In addition to, or as an alternative to, selecting and/or generating computer-generated voices for reiterations, the remote devices 314, 316 may be configured to alter audio content, such as the audio content captured by the microphone(s) 304, 306 and/or the reiterations selected and/or generated by the remote devices 314, 316, before the audio content is output by the receiver/speaker 310. The remote devices 314, 316 may be configured to alter the audio content before output by the receiver/speaker 310 in a variety of different ways so that the audio content may be output in a manner that is easier for the user of the hearing device 302 to comprehend. For example, the remote devices 314, 316 may be configured to alter the volume of audio content before output by the receiver/speaker 310. The remote devices 314, 316 may alter the volume of audio content before output by the receiver/speaker 310 by either lowering or raising the volume.

As described above, output of audio content captured by the microphone 304 may be prioritized over output of audio content captured by the microphone 306. This prioritization may be accomplished by outputting sounds captured by the microphone 304 at a higher volume than audio content captured by the microphone 306. The remote devices 314, 316 may be responsible for altering the volume of audio content captured by the microphone 304 to be higher, and/or altering the volume of audio content captured by the microphone 306 to be lower. The receiver/speaker 310 may simultaneously output the altered audio content captured by the microphone 304 and the microphone 306.

In addition to, or as an alternative to, altering the volume of audio content before output by the receiver/speaker 310, the remote devices 314, 316 may alter audio content in other ways. For example, the remote devices 314, 316 may alter the tone and/or frequency associated with audio content before output by the receiver/speaker 310. Those who are hard of hearing may have an easier time comprehending audio content, such as speech, associated with a certain tone and/or frequency. Accordingly, the remote devices 314, 316 may alter audio content so that they may be output by the receiver/speaker 310 at a higher or lower tone and/or frequency, at any intensity deemed to be desirable by the user of the hearing device 302.

As another example, the remote devices 314, 316 may alter the speed of audio content before output by the receiver/speaker 310. Those who are hard of hearing may have an easier time comprehending an individual that is speaking if that individual speaks slowly. Accordingly, the remote devices 314, 316 may alter audio content so that it is reiterated a reduced speed, at any intensity deemed to be desirable by the user of the hearing device 302. Additionally, or alternatively, the remote devices 314, 316 may filter out audio content that does not satisfy a threshold, and this audio content may not be output by the receiver/speaker 310. For example, the threshold may be determined by the user, and may indicate a rate of speech deemed to be desirable by the user. Audio content captured by the microphone(s) of the hearing aid may not satisfy the threshold if the sound is associated with a rate of speech that is not desirable to the user (e.g. too fast to comprehend).

As another example, the remote devices 314, 316 may replace particular words, terms, or phrases in captured speech with different words, terms, or phrases before output by the receiver/speaker 310. Those who are hard of hearing are often elderly and may have difficulty understanding the jargon used by younger generations. Accordingly, the remote devices 314, 316 may, in a reiteration of speech, replace certain words, terms, or phrases found in the original audio content with words, terms, or phrases that may be easier to comprehend (e.g. more age-appropriate) terms. For example, the remote devices 314, 316 may replace the word "PlayStation 5" with "Nintendo" or "video game console."

The remote devices 314, 316 may be configured to utilize, at least in part, deep fake technology for generating the computer-generated voices for the reiterations. As described above, deep fakes are fake videos or audio recordings that look and sound just like the real thing. For example, a deep fake may be a video or audio recording that looks and/or sounds just like a celebrity—but is not actually that celebrity. To create deep fakes, two machine learning (ML) models may be utilized. A first ML model may be trained on a data set and then be used to create video and/or audio forgeries, while the other ML model attempts to detect the forgeries. The first ML model creates fakes until the other ML model can no longer detect the forgery. The larger the set of training data, the easier it is for the first ML model to create a believable deep fake.

If the computer-generated voices are generated utilizing, at least in part, deep fake technology, the computer-generated voice may improve (e.g. sound more like the original voice) each time the microphone(s) 306, 306 capture this speaker's voice. A first ML model may be trained on a data set, which may include voice data captured by the microphone(s) 306, 306. The data set, including the voice data captured by the microphone(s) 306, 306 may be stored in a database accessible to the remote devices 314, 316. For example, the data set, including the voice data captured by the microphone(s) 306, 306 may be stored in a database 320 at a remote cloud network 318.

If this is the first time that audio content associated with the voice has been captured by the microphone(s) 304, 306, the training set may be small, and the first ML model may not be able to create a believable "fake" voice that mimics the original voice. Rather, the first ML model may select a generic female or male voice to be the first computer-generated iteration "deep fake" of the speaker's voice (depending on the gender of the original speaker). The second ML model may be able to easily detect that the first computer-generated iteration is indeed a "fake" voice.

As audio content associated with the original voice continues to be captured by the microphone(s) 304, 306, such as over the course of days, weeks, months, years, or any other time period, the training set on which the first ML model is trained may be increased. As the trainings set grows large enough, the first ML model may be able to generate a "fake" computer-generated voice that sounds more and more like the original voice. Eventually, enough audio content associated with the original voice may be captured so that the computer-generated voice sounds nearly identical to the original voice. For example, the second ML model may no longer be able to detect that the computer-generated voice is indeed a "fake" voice.

This utilization of deep fake technology may be particularly helpful when generating computer-generated voices for individuals that the user of the hearing device 302 interacts with frequently. For example, the user of the hearing device 302 may frequently interact with and converse with a particular friend or family member, such as his or her spouse. Due to this frequent interaction, enough audio content associated with the voice of these individuals may eventually be captured so that later iterations of the computer-generated voice sound nearly identical to the individuals' original voices. This deep fake technology may be utilized only for a portion of audio content captured by the microphone(s) of the hearing device 302 (such as speech associated with individuals who frequently interact with the user of the hearing aid), whereas other speech and/or audio content captured by the microphone(s) of the hearing aid may be generated using other techniques, such as by selecting a pre-programmed voice from a database.

Figure 4:
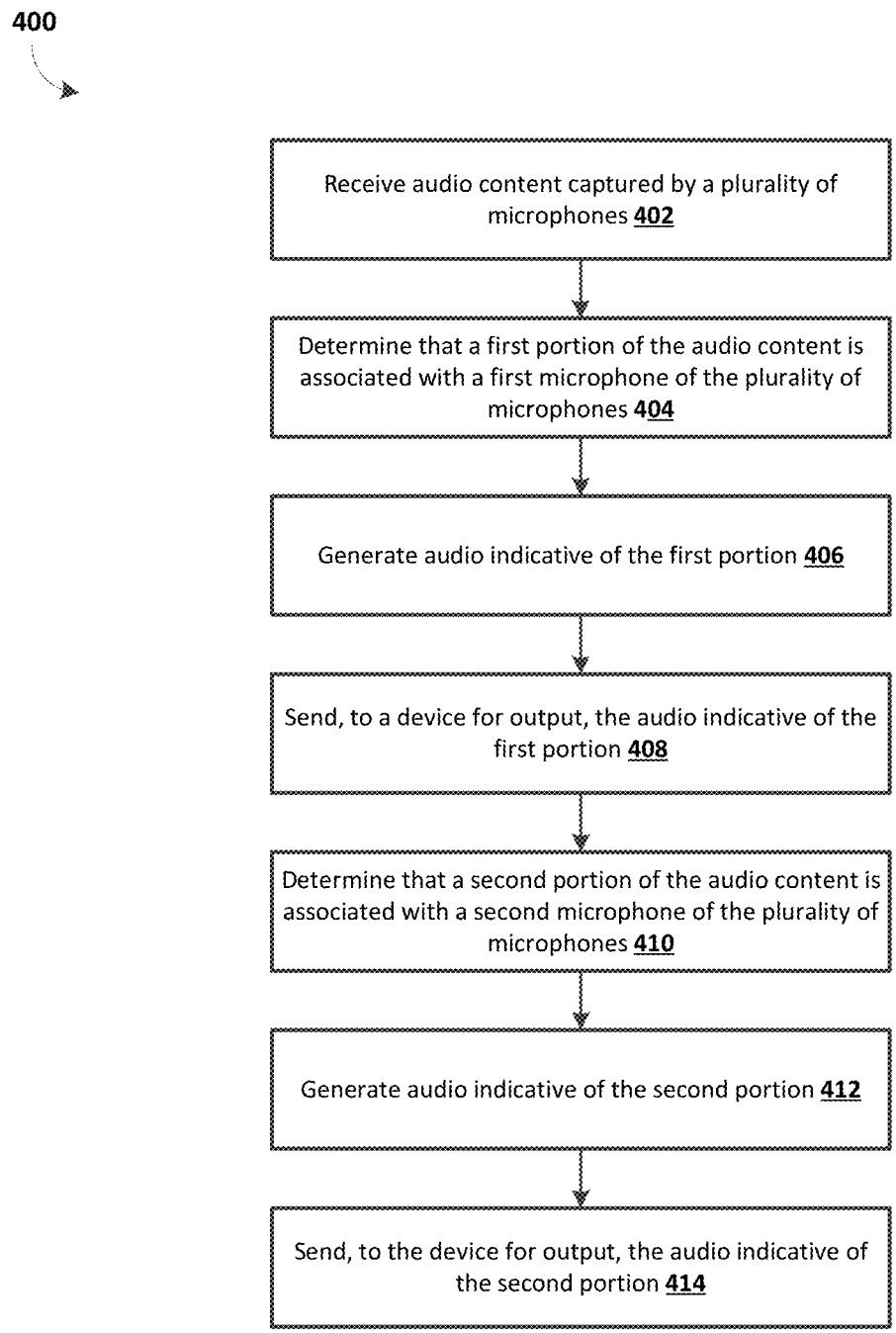
FIG. 4 illustrate an example flow chart.

As described above, a hearing device, such as the hearing device 200 and/or the hearing device 302, may select and/or generate the computer-generated voices for reiteration itself. Additionally, or alternatively, a hearing device may be in communication with a remote device responsible for selecting and/or generating the computer-generated voices. For example, a hearing device may have wireless connectivity features that allow it to communicate with the remote device responsible for selecting and/or generating the computer-generated voices. If the hearing aid is in communication with a remote device responsible for selecting and/or generating the computer-generated voices, the remote device may forward, to the hearing aid for output, the computer-generated reiterations of the original speech. FIG. 4 depicts a method 400 for selecting and/or generating computer-generated reiterations for output by a hearing device. The method 400 may be performed by a device located remote to the hearing device, such as a smartphone that is in communication with the hearing device and configured to generate computer-generated reiterations for output by the hearing device.

At 402, audio content captured by a plurality of microphones may be received. The audio content may comprise audio content captured by one or more microphones of a hearing device. For example, the audio content data may comprise audio content captured by a unidirectional and/or an omnidirectional microphone of a hearing device. The audio content may be indicative of speech and/or a voice. For example, the audio content may be indicative of speech and/or a voice associated with an individual that speaks to the user of the hearing device. For example, the speech and/or voice may be associated with a friend or family member of the user of the hearing device. If the audio content is indicative of speech and/or a voice, the audio content may be associated with data that is indicative of a voice pattern associated with the speech and/or voice. The data may indicate one or more of a frequency, a cadence, an accent, or a timbre associated with the speech and/or voice.

At 404, it may be determined that a first portion of the audio content is associated with a first microphone of the plurality of microphones. The first microphone may be, for example, a unidirectional microphone. As discussed above, a unidirectional microphone may be a microphone that picks up audio content with high gain (e.g. loudness) from a specific side and/or direction of the microphone. For example, if a person is speaking into a unidirectional microphone, the person must speak into the correct side (e.g. the front side), of the microphone in order for the microphone to pick up the speech with a high gain. If the first microphone is a unidirectional microphone, the first microphone may pick up audio content with high gain from the side and/or direction of the first microphone that is in front of a user wearing the hearing device. For example, if the first microphone is a unidirectional microphone, the first microphone may pick up audio content with a high gain from a speaker that is standing in front of the user of the hearing device. The first microphone may not capture audio content from a speaker standing behind the user of the hearing device. Determining that the first portion of the audio content is associated with the first microphone may comprise determining that the first portion of the audio content originated from the side and/or direction from which the unidirectional microphone picks up sound with a high gain.

At 406, audio indicative of the first portion may be generated. As discussed above, a computing device located remote to the hearing device may be configured to select and/or generate computer-generated voices for reiterating sounds captured by the microphone(s) of the hearing device. The audio indicative of the first portion of the audio content may be a computer-generated reiteration of the first portion of the audio content, such as a computer-generated reiteration of speech captured by the first microphone. To select and/or generate computer-generated voices for reiterating sounds captured by the first microphone, the remote computing device may convert the first portion of the audio content (e.g. speech) captured by the first microphone into text. Any known speech-to-text software may be utilized to convert speech captured by the first microphone into text. The text may be reiterated by a computer-generated voice.

The computer-generated voice chosen to reiterate the text may be dependent, at least in part, on the voice patterns associated with the speaker of the original speech (e.g. the first sound). Selecting a computer-generated voice based at least on voice patterns associated with the speaker of the original speech may allow the user of the hearing device to differentiate between different speakers. For example, the user of the hearing device may be able to differentiate between the voice of his or her 6-year old great granddaughter and the voice of his or her spouse.

For example, the frequency of the original voice may be used to select a computer-generated voice for the reiteration. As described above, a child's voice may be associated with a different voice frequency (e.g. a higher frequency) than an adult speaker. Accordingly, the computer-generated voice selected and/or generated to reiterate speech associated with a child's voice may have a different frequency (e.g. a higher frequency) than a computer-generated voice selected to reiterate speech associated with an adult's voice. Likewise, different genders may be associated with different voice frequencies. For example, a female speaker may be associated with a higher voice frequency than a male speaker. In addition to, or as an alternative to voice frequency, other voice patterns associated with the original voice may be used to select a computer-generated voice for the reiteration. For example, one or more of a cadence, accent, or timbre associated with the original voice may be used to select a computer-generated voice for the reiteration. The computer-generated voice for reiteration may be selected from a variety of pre-programmed voices.

The computer-generated reiteration of the first portion of the audio content may reiterate the first portion of the audio content (e.g. speech) in a manner that sounds almost identical to the first portion of the audio content. Alternatively, the computer-generated reiteration of the first portion of the audio content may be altered in a manner that is easier for the user of the hearing device to comprehend. For example, the computer-generated reiteration of the first portion of the audio content may have a different volume than the first portion of the audio content. For example, the computer-generated reiteration of the first portion of the audio content may have a higher or lower volume than the first portion of the audio content. The computer-generated reiteration of the first portion of the audio content may additionally, or alternatively, have a different tone and/or frequency than the first portion of the audio content. Those who are hard of hearing may have an easier time comprehending sounds, such as speech, associated with a certain volume, tone and/or frequency. Accordingly, when reiterated, the first portion of the audio content may be altered to have any volume, tone and/or frequency, at any intensity deemed to be desirable by the user of the hearing device.

As another example, the computer-generated reiteration of the first portion of the audio content may have a different speed than the first portion of the audio content. Those who are hard of hearing may have an easier time comprehending an individual that is speaking if that individual speaks slowly. Accordingly, when reiterated, the first portion of the audio content may be altered so that the speech is reiterated at a reduced speed, at any intensity deemed to be desirable by the user of the hearing device. As another example, the computer-generated reiteration of the first portion of the audio content may replace particular words, terms, or phrases in the first portion of the audio content with different words, terms, or phrases. Those who are hard of hearing are often elderly and may have difficulty understanding the jargon used by younger generations. Accordingly, when reiterating the first portion of the audio content, certain words, terms, or phrases found in the original speech may be replaced with words, terms, or phrases that are easier to comprehend (e.g. more age-appropriate) terms. For example, the word "PlayStation 5" may be replaced with "Nintendo" or "video game console."

At 408, the audio indicative of the first portion of the audio content may be sent to the hearing device for output. The hearing device may comprise one or more speakers that are configured to output the audio indicative of the first portion of the audio content. For example, the one or more speakers may be configured to output the computer-generated reiteration of the first portion of the audio content (e.g. speech) for listening by the user of the hearing device.

At 410, it may be determined that a second portion of the audio content is associated with a second microphone of the plurality of microphones. The second microphone may be, for example, an omnidirectional microphone. As discussed above, an omnidirectional microphone may be a microphone that picks up audio content with equal gain (e.g. loudness) from all sides and/or directions of the microphone, rather than just from a specific side and/or direction. If the second microphone is an omnidirectional microphone, the second microphone may capture audio content coming from a speaker positioned in front of the user wearing the hearing device with the same gain as audio content coming from a speaker positioned behind the user wearing the hearing device. Determining that the second portion of the audio content is associated with the second microphone may comprise determining that the second portion of the audio content originated from a side and/or direction of the hearing device that is different from the side and/or direction from which the first microphone (e.g. unidirectional microphone) picks up audio content with a high gain. In other words, determining that the second portion of the audio content of the audio content is associated with the second microphone may comprise determining that the second portion of the audio content originated from a side and/or direction of the hearing device from which the first microphone (e.g. unidirectional microphone) does not pick up sound with a high gain.

At 412, audio indicative of the second portion of the audio content may be generated. The audio indicative of the second portion of the audio content may also be a computer-generated reiteration, such as a computer-generated reiteration of the second portion of the audio content. The computer-generated reiteration of the second portion of the audio content may be generated in a manner similar to how the audio indicative of the first portion of the audio content is generated, as described above with respect to step 406.

However, the second portion of the audio content may be indicative of speech from a different individual (e.g. a different voice) than the first portion of the audio content. If the second portion of the audio content is indicative of speech from a different individual than the first portion of the audio content, the second portion of the audio content may be associated with a different voice pattern (e.g. different frequency, timbre, and/or amplitude) than the first portion of audio content. For example, the first portion of the audio content may be indicative of a woman's voice and the second portion of the audio content may be indicative of a man's voice (or vice versa). If the second portion of the audio content is associated with a different voice pattern (e.g. different frequency, timbre, and/or amplitude) than the first portion of audio content, the computer-generated reiteration of the second portion of audio content may have at least one of a different frequency, timbre, or amplitude than the computer-generated reiteration of the first portion of audio content. This may allow the user of the hearing device to distinguish between different voices, such as between the voice associated with the first portion of audio content and the voice associated with the second portion of audio content.

At 414, the audio indicative of the second portion of the audio content may be sent to the hearing device for output. As described above, the hearing device may comprise one or more speakers that are configured to output the audio indicative of the first portion of the audio content. For example, the one or more speakers may be configured to output the computer-generated reiteration of the first portion of the audio content (e.g. speech) for listening by the user of the hearing device. The speaker(s) may also be configured to output the audio indicative of the second sound. As described above, sounds captured by a unidirectional microphone may be prioritized over sounds captured by an omnidirectional microphone. If the first microphone is a unidirectional microphone and/or the second microphone is an omnidirectional microphone, the hearing device may prioritize the output of the audio indicative of the first portion of the audio content over the output of the audio indicative of the second portion of the audio content.

This prioritization may be accomplished in a variety of different ways. For example, this prioritization may be accomplished by the hearing aid outputting, to the user, the audio indicative of the first portion of the audio content before outputting the audio indicative of the second portion of the audio content. In this way, the user of the hearing aid will be able to hear audio content captured by the unidirectional microphone without that audio content being overtaken by background noise. Once the hearing aid has output the audio indicative of the first portion of the audio content, the hearing aid may then output the audio indicative of the second portion of the audio content. For example, if the user of the hearing aid is in a coffee shop having a conversation with a friend, the hearing aid may first output sounds captured by the unidirectional microphone (e.g. the conversation with the friend). After the conversation has ended, or taken a pause, the hearing aid may then output sounds captured by the omnidirectional microphone (e.g. the background music and/or chatter in the coffee shop).

The prioritization may additionally, or alternatively, be accomplished by the hearing aid outputting, to the user, the audio indicative of the first portion of the audio content at a higher volume than the audio indicative of the second portion of the audio content. In this way, the sounds captured by both the unidirectional microphone and the omnidirectional microphone may be simultaneously output, but the user will still be able to hear the sounds captured by the unidirectional microphone without those sounds being overtaken by background noise.

Figure 5:
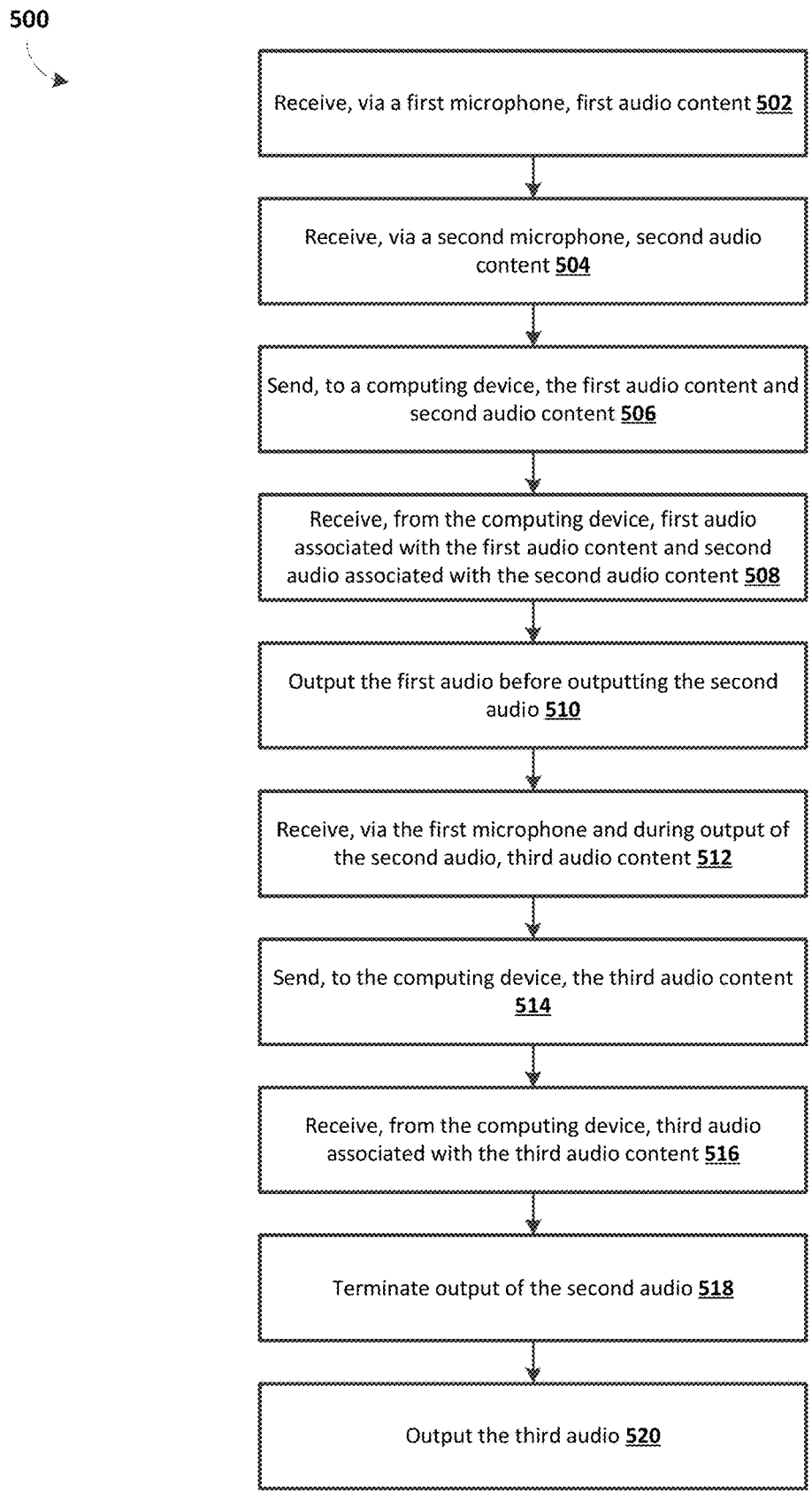
FIG. 5 illustrates an example flow chart.

FIG. 5 depicts a method 500 for selecting and/or generating computer-generated reiterations for output by a hearing device. The method 500 may be performed by the hearing device. The method 500 may be used to prioritize the output of sounds captured by a unidirectional microphone over the output of sounds captured by an omnidirectional microphone. For example, audio content captured by a unidirectional microphone may be output before audio content captured by an omnidirectional microphone is output.

At 502, first audio content may be received. The first audio content may comprise audio content captured by one or more microphones of a hearing device, such as a first microphone. The first audio content may be indicative of speech and/or a voice. For example, the first audio content may be indicative of speech and/or a voice associated with an individual that speaks to the user of the hearing device. For example, the speech and/or voice may be associated with a friend or family member of the user of the hearing device. If the first audio content is indicative of speech and/or a voice, the first audio content may be associated with data that is indicative of a voice pattern associated with the speech and/or voice. The data may indicate one or more of a frequency, a cadence, an accent, or a timbre associated with the speech and/or voice.

The first microphone may be, for example, a unidirectional microphone. As discussed above, a unidirectional microphone may be a microphone that picks up audio content with high gain (e.g. loudness) from a specific side and/or direction of the microphone. For example, if a person is speaking into a unidirectional microphone, the person must speak into the correct side (e.g. the front side), of the microphone in order for the microphone to pick up the speech with a high gain. If the first microphone is a unidirectional microphone, the first microphone may pick up audio content with high gain from the side and/or direction of the first microphone that is in front of a user wearing the hearing device. For example, if the first microphone is a unidirectional microphone, the first microphone may pick up audio content with a high gain from a speaker that is standing in front of the user of the hearing device. The first microphone may not capture audio content from a speaker standing behind the user of the hearing device. Determining that the first portion of the audio content is associated with the first microphone may comprise determining that the first portion of the audio content originated from the side and/or direction from which the unidirectional microphone picks up audio content with a high gain.

At 504, second audio content may be received. The second audio content may be received via a second microphone. The second audio content may comprise audio content captured by one or more different microphones of a hearing device, such as a second microphone. The second audio content may be indicative of speech and/or a voice. For example, the second audio content may be indicative of speech and/or a voice associated with an individual that speaks to the user of the hearing device. For example, the speech and/or voice may be associated with a friend or family member of the user of the hearing device. If the second audio content is indicative of speech and/or a voice, the second audio content may be associated with data that is indicative of a voice pattern associated with the speech and/or voice. The data may indicate one or more of a frequency, a cadence, an accent, or a timbre associated with the speech and/or voice.

The second microphone may be, for example, an omnidirectional microphone. As discussed above, an omnidirectional microphone may be a microphone that picks up audio content with equal gain (e.g. loudness) from all sides and/or directions of the microphone, rather than just from a specific side and/or direction. If the second microphone is an omnidirectional microphone, the second microphone may capture audio content coming from a speaker positioned in front of the user wearing the hearing device with the same gain as audio content coming from a speaker positioned behind the user wearing the hearing device. Determining that the second portion of the audio content is associated with the second microphone may comprise determining that the second portion of the audio content originated from a side and/or direction of the hearing device that is different from the side and/or direction from which the first microphone (e.g. unidirectional microphone) picks up sound with a high gain. In other words, determining that the second portion of the audio content of the audio content is associated with the second microphone may comprise determining that the second portion of the audio content originated from a side and/or direction of the hearing device from which the first microphone (e.g. unidirectional microphone) does not pick up sound with a high gain.

As discussed above, a computing device may be configured to select and/or generate computer-generated voices for reiterating sounds captured by the microphone(s) of the hearing device. At 506, the first audio content and the second audio content may be sent to a computing device. The computing device may be located within the hearing device, and/or the computing device may be located remote to the hearing device. The computing device may receive the first audio content and/or the second audio content and may select and/or generate a computer-generated voice for reiterating the first audio content and/or the second audio content. At 508, first audio associated with the first audio content and second audio associated with the second audio content may be received. The first audio may be a computer-generated voice that reiterates the first audio content. The second audio may be a computer-generated voice that reiterates the second audio content.

To select and/or generate the computer-generated voices for reiterating the first audio content and/or the second audio content, the computing device, regardless of whether it is remote to the hearing device or located within the hearing device, may convert the first audio content and/or second audio content (e.g. speech) into text. Any known speech-to-text software may be utilized to convert the first audio content and/or the second audio content into text. The text may be reiterated by a computer-generated voice.

The computer-generated voice chosen to reiterate the text may be dependent, at least in part, on the voice patterns associated with the speaker of the original speech (e.g. the speaker associated with the first audio content and/or the second audio content). Selecting a computer-generated voice based at least on voice patterns associated with the speaker of the original speech may allow the user of the hearing device to differentiate between different speakers. For example, the user of the hearing device may be able to differentiate between the voice of his or her 6-year old great granddaughter and the voice of his or her spouse.

For example, the frequency of the original speaker's voice may be used to select a computer-generated voice for the reiteration. As described above, a child speaker may be associated with a different voice frequency (e.g. a higher frequency) than an adult speaker. Accordingly, the computer-generated voice selected and/or generated to reiterate speech associated with a child speaker may have a different frequency (e.g. a higher frequency) than a computer-generated voice selected to reiterate speech associated with an adult speaker. Likewise, different genders may be associated with different voice frequencies. For example, a female speaker may be associated with a higher voice frequency than a male speaker. In addition to, or as an alternative to voice frequency, other voice patterns associated with the speaker of the original speech may be used to select a computer-generated voice for the reiteration. For example, one or more of a cadence, accent, or timbre associated with the original speaker may be used to select a computer-generated voice for the reiteration. The computer-generated voice for reiteration may be selected from a variety of pre-programmed voices.

The computer-generated reiteration of the first audio content and/or the second audio content may reiterate the first audio content and/or the second audio content in a manner that sounds almost identical to the original audio content (e.g. the first audio content and/or the second audio content). Alternatively, the computer-generated reiteration of the first audio content and/or the second audio content may be altered in a manner that is easier for the user of the hearing device to comprehend. For example, the computer-generated reiteration of the first audio content and/or the second audio content may have a different volume than the original audio content. For example, the computer-generated reiteration of the first audio content and/or the second audio content may have a higher or lower volume than the original audio content. The computer-generated reiteration of the first audio content and/or the second audio content may additionally, or alternatively, have a different tone and/or frequency than the original audio content. Those who are hard of hearing may have an easier time comprehending sounds, such as speech, associated with a certain volume, tone and/or frequency. Accordingly, when reiterated, the first audio content and/or the second audio content may be altered to have any volume, tone and/or frequency, at any intensity deemed to be desirable by the user of the hearing device.

As another example, the computer-generated reiteration of the first audio content and/or the second audio content may have a different speed than the original audio content. Those who are hard of hearing may have an easier time comprehending an individual that is speaking if that individual speaks slowly. Accordingly, when reiterated, the first audio content and/or the second audio content may be altered so that the speech is reiterated at a reduced speed, at any intensity deemed to be desirable by the user of the hearing device. As another example, the computer-generated reiteration of the first audio content and/or the second audio content may replace particular words, terms, or phrases in the original audio content with different words, terms, or phrases. Those who are hard of hearing are often elderly and may have difficulty understanding the jargon used by younger generations. Accordingly, when reiterating the first audio content and/or the second audio content, certain words, terms, or phrases found in the original audio content may be replaced with words, terms, or phrases that are easier to comprehend (e.g. more age-appropriate) terms. For example, the word "PlayStation 5" may be replaced with "Nintendo" or "video game console."

As also described above, the output of sounds captured by a unidirectional microphone may be prioritized over the output of sounds captured by an omnidirectional microphone. If the first microphone is a unidirectional microphone and/or the second microphone is an omnidirectional microphone, the hearing device may prioritize the output of the first audio over the output of the second audio. This prioritization may be accomplished in a variety of different ways. For example, this prioritization may be accomplished by the hearing aid outputting, to the user, the first audio before outputting the second audio. In this way, the user of the hearing aid will be able to hear the sounds captured by the unidirectional microphone without those sounds being overtaken by background noise. Once the hearing aid has output the audio indicative of the first portion of the audio content, the hearing aid may then output the audio indicative of the second portion of the audio content.

At 510, the first audio may be output. The hearing device may comprise one or more speakers that are configured to output audio to a user of the hearing device. The one or more speakers may output the first audio to a user of the hearing device. For example, the one or more speakers may output the computer-generated reiteration of the first audio content (e.g. speech) for listening by the user of the hearing device. The second audio may be output after the output of the first audio is complete. The speaker(s) may also be configured to output the second sound. For example, if the user of the hearing aid is in a coffee shop having a conversation with a friend, the hearing aid may first output sounds captured by the unidirectional microphone (e.g. the conversation with the friend). After the conversation has ended, or taken a pause, the hearing aid may then output sounds captured by the omnidirectional microphone (e.g. the background music and/or chatter in the coffee shop).

The second audio may be output until output of the second audio is complete. Alternatively, output of the second audio may be terminated if additional audio content is received via the first microphone (e.g. the unidirectional microphone). If output of audio content captured by the first microphone is prioritized over the output of audio content captured by the second microphone, the output of additional audio content received via the first microphone may take priority over output of the second audio. At 512, third audio content may be received via the first microphone. The third audio content may be received during output of the second output.

The third audio content may comprise audio content captured by one or more microphones of a hearing device, such as the same microphone that captured the first audio content. The third audio content may be indicative of speech and/or a voice. For example, the third audio content may be indicative of speech and/or a voice associated with an individual that speaks to the user of the hearing device. For example, the speech and/or voice may be associated with a friend or family member of the user of the hearing device. If the third audio content is indicative of speech and/or a voice, the third audio content may be associated with data that is indicative of a voice pattern associated with the speech and/or voice. The data may indicate one or more of a frequency, a cadence, an accent, or a timbre associated with the speech and/or voice.

As discussed above, a computing device may be configured to select and/or generate computer-generated voices for reiterating sounds captured by the microphone(s) of the hearing device. At 514, the third audio content may be sent to a computing device. The computing device may be located within the hearing device, and/or the computing device may be located remote to the hearing device. The computing device may be the same computing device that the first audio content and/or the second audio content are sent to at 506. The computing device may receive the third audio content and may select and/or generate a computer-generated voice for reiterating the third audio content.

At 516, third audio associated with the third audio content may be received from the computing device. The third audio may be a computer-generated voice that reiterates the third audio content. To select and/or generate the computer-generated voices for reiterating the third audio content, the computing device, regardless of whether it is remote to the hearing device or located within the hearing device, may convert the third audio content (e.g. speech) into text. Any known speech-to-text software may be utilized to convert the third audio content into text. The text may be reiterated by a computer-generated voice.

The computer-generated voice chosen to reiterate the text may be dependent, at least in part, on the voice patterns associated with the speaker of the original speech (e.g. the speaker associated with the first audio content and/or the second audio content). Selecting a computer-generated voice based at least on voice patterns associated with the speaker of the original speech may allow the user of the hearing device to differentiate between different speakers. For example, the user of the hearing device may be able to differentiate between the voice of his or her 6-year old great granddaughter and the voice of his or her spouse.

For example, the frequency of the original speaker's voice may be used to select a computer-generated voice for the reiteration. As described above, a child speaker may be associated with a different voice frequency (e.g. a higher frequency) than an adult speaker. Accordingly, the computer-generated voice selected and/or generated to reiterate speech associated with a child speaker may have a different frequency (e.g. a higher frequency) than a computer-generated voice selected to reiterate speech associated with an adult speaker. Likewise, different genders may be associated with different voice frequencies. For example, a female speaker may be associated with a higher voice frequency than a male speaker. In addition to, or as an alternative to voice frequency, other voice patterns associated with the speaker of the original speech may be used to select a computer-generated voice for the reiteration. For example, one or more of a cadence, accent, or timbre associated with the original speaker may be used to select a computer-generated voice for the reiteration. The computer-generated voice for reiteration may be selected from a variety of pre-programmed voices.

The computer-generated reiteration of the third audio content may reiterate the third audio content in a manner that sounds almost identical to the original audio content (e.g. the third audio content). Alternatively, the computer-generated reiteration of the third audio content may be altered in a manner that is easier for the user of the hearing device to comprehend. For example, the computer-generated reiteration of the third audio content may have a different volume than the original audio content. For example, the computer-generated reiteration of the third audio content may have a higher or lower volume than the original audio content. The computer-generated reiteration of the third audio content and/or the third audio content may additionally, or alternatively, have a different tone and/or frequency than the original audio content. Those who are hard of hearing may have an easier time comprehending sounds, such as speech, associated with a certain volume, tone and/or frequency. Accordingly, when reiterated, the third audio content may be altered to have any volume, tone and/or frequency, at any intensity deemed to be desirable by the user of the hearing device.

As another example, the computer-generated reiteration of the third audio content may have a different speed than the original audio content. Those who are hard of hearing may have an easier time comprehending an individual that is speaking if that individual speaks slowly. Accordingly, when reiterated, the third audio content may be altered so that the speech is reiterated at a reduced speed, at any intensity deemed to be desirable by the user of the hearing device. As another example, the computer-generated reiteration of the third audio content may replace particular words, terms, or phrases in the original audio content with different words, terms, or phrases. Those who are hard of hearing are often elderly and may have difficulty understanding the jargon used by younger generations. Accordingly, when reiterating the third audio content, certain words, terms, or phrases found in the original audio content may be replaced with words, terms, or phrases that are easier to comprehend (e.g. more age-appropriate) terms. For example, the word "PlayStation 5" may be replaced with "Nintendo" or "video game console."

If the third audio content was captured by the first microphone (e.g. unidirectional microphone), the output of the third audio may be prioritized over the output of the second audio. At 518, output of the second audio may be terminated. Output of the second audio may be terminated so that the third audio may be output to the user of the hearing device in a manner that is easy for the user of the hearing device to comprehend. For example, by terminating output of the second audio, the output of the third audio may not be overtaken by sounds, such as background noise, that are more likely to be captured by the second microphone (e.g. omnidirectional microphone).

At 520, the third audio may be output. As described above, the hearing device may comprise one or more speakers that are configured to output audio to a user of the hearing device. The one or more speakers may output the third audio to a user of the hearing device. For example, the one or more speakers may output the computer-generated reiteration of the third audio content (e.g. speech) for listening by the user of the hearing device. The second audio may continue to be output after the output of the third audio is complete. For example, the user of the hearing aid may be in a coffee shop having a conversation with a friend. The third audio and first audio may be associated with that same conversation. The second audio, which may not be associated with the conversation, may be output after the conversation has ended, or during a pause in the conversation (e.g. during the time period in between the unidirectional microphone capturing the first audio content and the third audio content.)

Figure 6:
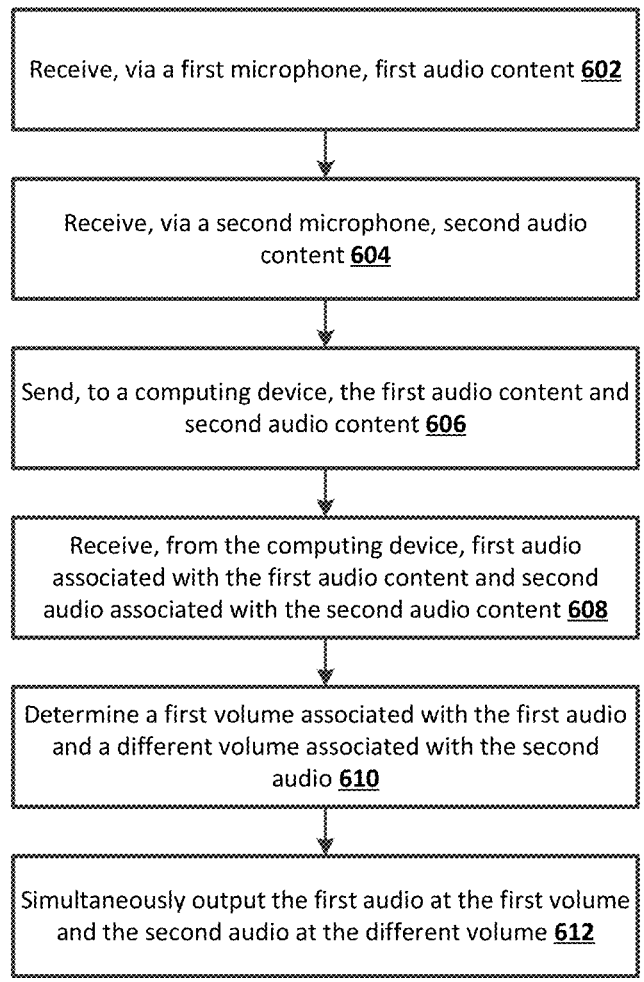
FIG. 6 illustrates an example flow chart.

As described above, a hearing aid may prioritize the output of sounds captured by a unidirectional microphone over the output of sounds captured by an omnidirectional microphone. This prioritization may be accomplished in a variety of different ways. For example, as discussed above with respect to FIG. 5, this prioritization may be accomplished by the hearing aid outputting, to the user, audio content captured by a unidirectional microphone before outputting the audio content captured by an omnidirectional microphone. Additionally, or alternatively, this prioritization may be accomplished by outputting, to the user, the audio captured by the unidirectional microphone at a higher volume than the audio captured by the omnidirectional microphone. In this way, the sounds captured by both the unidirectional microphone and the omnidirectional microphone may be simultaneously output, but the user will still be able to hear the sounds captured by the unidirectional microphone without those sounds being overtaken by background noise. FIG. 6 depicts a method 600 for selecting and/or generating computer-generated reiterations for output by a hearing device. The method 600 may be performed by the hearing device. The method 600 may be used to prioritize the output of sounds captured by a unidirectional microphone over the output of sounds captured by an omnidirectional microphone. For example, audio content captured by a unidirectional microphone and audio content captured by an omnidirectional microphone may be simultaneously output, but at different volumes.

At 602, first audio content may be received. The first audio content may comprise audio content captured by one or more microphones of a hearing device, such as a first microphone. The first audio content may be indicative of speech and/or a voice. For example, the first audio content may be indicative of speech and/or a voice associated with an individual that speaks to the user of the hearing device. For example, the speech and/or voice may be associated with a friend or family member of the user of the hearing device. If the first audio content is indicative of speech and/or a voice, the first audio content may be associated with data that is indicative of a voice pattern associated with the speech and/or voice. The data may indicate one or more of a frequency, a cadence, an accent, or a timbre associated with the speech and/or voice.

The first microphone may be, for example, a unidirectional microphone. As discussed above, a unidirectional microphone may be a microphone that picks up sound with high gain (e.g. loudness) from a specific side and/or direction of the microphone. For example, if a person is speaking into a unidirectional microphone, the person must speak into the correct side (e.g. the front side), of the microphone in order for the microphone to pick up the speech with a high gain. If the first microphone is a unidirectional microphone, the first microphone may pick up sound with high gain from the side and/or direction of the first microphone that is in front of a user wearing the hearing device. For example, if the first microphone is a unidirectional microphone, the first microphone may pick up sound with a high gain from a speaker that is standing in front of the user of the hearing device. The first microphone may not capture sound from a speaker standing behind the user of the hearing device. Determining that the first portion of the audio content is associated with the first microphone may comprise determining that the first portion of the audio content originated from the side and/or direction from which the unidirectional microphone picks up sound with a high gain.

At 604, second audio content may be received. The second audio content may be received via a second microphone. The second audio content may comprise audio content captured by one or more different microphones of a hearing device, such as a second microphone. The second audio content may be indicative of speech and/or a voice. For example, the second audio content may be indicative of speech and/or a voice associated with an individual that speaks to the user of the hearing device. For example, the speech and/or voice may be associated with a friend or family member of the user of the hearing device. If the second audio content is indicative of speech and/or a voice, the second audio content may be associated with data that is indicative of a voice pattern associated with the speech and/or voice. The data may indicate one or more of a frequency, a cadence, an accent, or a timbre associated with the speech and/or voice.

The second microphone may be, for example, an omnidirectional microphone. As discussed above, an omnidirectional microphone may be a microphone that picks up sound with equal gain (e.g. loudness) from all sides and/or directions of the microphone, rather than just from a specific side and/or direction. If the second microphone is an omnidirectional microphone, the second microphone may capture sound coming from a speaker positioned in front of the user wearing the hearing device with the same gain as sound coming from a speaker positioned behind the user wearing the hearing device. Determining that the second portion of the audio content is associated with the second microphone may comprise determining that the second portion of the audio content originated from a side and/or direction of the hearing device that is different from the side and/or direction from which the first microphone (e.g. unidirectional microphone) picks up sound with a high gain. In other words, determining that the second portion of the audio content of the audio content is associated with the second microphone may comprise determining that the second portion of the audio content originated from a side and/or direction of the hearing device from which the first microphone (e.g. unidirectional microphone) does not pick up sound with a high gain.

As discussed above, a computing device may be configured to select and/or generate computer-generated voices for reiterating sounds captured by the microphone(s) of the hearing device. At 606, the first audio content and the second audio content may be sent to a computing device. The computing device may be located within the hearing device, and/or the computing device may be located remote to the hearing device. The computing device may receive the first audio content and/or the second audio content and may select and/or generate a computer-generated voice for reiterating the first audio content and/or the second audio content. At 608, first audio associated with the first audio content and second audio associated with the second audio content may be received. The first audio may be a computer-generated voice that reiterates the first audio content. The second audio may be a computer-generated voice that reiterates the second audio content.

To select and/or generate the computer-generated voices for reiterating the first audio content and/or the second audio content, the computing device, regardless of whether it is remote to the hearing device or located within the hearing device, may convert the first audio content and/or second audio content (e.g. speech) into text. Any known speech-to-text software may be utilized to convert the first audio content and/or the second audio content into text. The text may be reiterated by a computer-generated voice.

The computer-generated voice chosen to reiterate the text may be dependent, at least in part, on the voice patterns associated with the speaker of the original speech (e.g. the speaker associated with the first audio content and/or the second audio content). Selecting a computer-generated voice based at least on voice patterns associated with the speaker of the original speech may allow the user of the hearing device to differentiate between different speakers. For example, the user of the hearing device may be able to differentiate between the voice of his or her 6-year old great granddaughter and the voice of his or her spouse.

For example, the frequency of the original speaker's voice may be used to select a computer-generated voice for the reiteration. As described above, a child speaker may be associated with a different voice frequency (e.g. a higher frequency) than an adult speaker. Accordingly, the computer-generated voice selected and/or generated to reiterate speech associated with a child speaker may have a different frequency (e.g. a higher frequency) than a computer-generated voice selected to reiterate speech associated with an adult speaker. Likewise, different genders may be associated with different voice frequencies. For example, a female speaker may be associated with a higher voice frequency than a male speaker. In addition to, or as an alternative to voice frequency, other voice patterns associated with the speaker of the original speech may be used to select a computer-generated voice for the reiteration. For example, one or more of a cadence, accent, or timbre associated with the original speaker may be used to select a computer-generated voice for the reiteration. The computer-generated voice for reiteration may be selected from a variety of pre-programmed voices.

The computer-generated reiteration of the first audio content and/or the second audio content may reiterate the first audio content and/or the second audio content in a manner that sounds almost identical to the original audio content (e.g. the first audio content and/or the second audio content). Alternatively, the computer-generated reiteration of the first audio content and/or the second audio content may be altered in a manner that is easier for the user of the hearing device to comprehend. For example, the computer-generated reiteration of the first audio content and/or the second audio content may have a different volume than the original audio content. For example, the computer-generated reiteration of the first audio content and/or the second audio content may have a higher or lower volume than the original audio content. The computer-generated reiteration of the first audio content and/or the second audio content may additionally, or alternatively, have a different tone and/or frequency than the original audio content. Those who are hard of hearing may have an easier time comprehending sounds, such as speech, associated with a certain volume, tone and/or frequency. Accordingly, when reiterated, the first audio content and/or the second audio content may be altered to have any volume, tone and/or frequency, at any intensity deemed to be desirable by the user of the hearing device.

As another example, the computer-generated reiteration of the first audio content and/or the second audio content may have a different speed than the original audio content. Those who are hard of hearing may have an easier time comprehending an individual that is speaking if that individual speaks slowly. Accordingly, when reiterated, the first audio content and/or the second audio content may be altered so that the speech is reiterated at a reduced speed, at any intensity deemed to be desirable by the user of the hearing device. As another example, the computer-generated reiteration of the first audio content and/or the second audio content may replace particular words, terms, or phrases in the original audio content with different words, terms, or phrases. Those who are hard of hearing are often elderly and may have difficulty understanding the jargon used by younger generations. Accordingly, when reiterating the first audio content and/or the second audio content, certain words, terms, or phrases found in the original audio content may be replaced with words, terms, or phrases that are easier to comprehend (e.g. more age-appropriate) terms. For example, the word "PlayStation 5" may be replaced with "Nintendo" or "video game console."

As also described above, the output of sounds captured by a unidirectional microphone may be prioritized over the output of sounds captured by an omnidirectional microphone. If the first microphone is a unidirectional microphone and/or the second microphone is an omnidirectional microphone, the hearing device may prioritize the output of the first audio over the output of the second audio. This prioritization may be accomplished in a variety of different ways. For example, this prioritization may be accomplished by outputting, to the user, the audio captured by the unidirectional microphone at a higher volume than the audio captured by the omnidirectional microphone. In this way, the sounds captured by both the unidirectional microphone and the omnidirectional microphone may be simultaneously output, but the user will still be able to hear the sounds captured by the unidirectional microphone without those sounds being overtaken by background noise.

At 610, a first volume associated with the first audio may be determined. A second volume associated with the second audio may additionally, or alternatively, be determined. The first and second volumes may be determined, for example, by the hearing device. Alternatively, as discussed above, if a remote computing device is responsible for selecting and/or generating the first and/or second audio, the remote computing device may have already determined the first and second volumes before the first audio and second audio were received by the hearing device. The first volume may be greater (e.g. louder) than the second volume. Determining the first volume and/or the second volume may comprise raising the original volume associated with the first audio and/or lowering the original volume associated with the second audio.

At 612, the first audio and the second audio may be simultaneously output. The hearing device may comprise one or more speakers that are configured to output audio to a user of the hearing device. The one or more speakers may simultaneously output the first and second audio to a user of the hearing device. For example, the one or more speakers may simultaneously output the computer-generated reiterations of the first audio content and the second audio content for listening by the user of the hearing device. The first audio may be output at the first volume, while the second audio may be output at the second volume. For example, if the user of the hearing aid is in a coffee shop having a conversation with a friend, the hearing aid may simultaneously output sounds captured by the unidirectional microphone (e.g. the conversation with the friend) and sounds captured by the omnidirectional microphone (e.g. the background music and/or chatter in the coffee shop). The conversation with the friend may be output at a higher volume than the background music and/or chatter so that the user of the hearing aid is able to clearly understand what his or her friend is saying.

As described above, a computer-generated voice may reiterate a sound captured by a microphone of a hearing device. For example, if a microphone of the hearing device captures speech, a computer-generated voice for reiterating that speech may be selected and/or generated. The computer-generated voice may be selected and/or generated, at least in part, on voice patterns associated with the speaker of the original speech. By selecting and/or generating a computer-generated voice based at least on voice patterns associated with the speaker of the original speech, the user of the hearing aid may be able to differentiate between different speakers. For example, the user of the hearing aid may be able to differentiate between his or her 6-year old great granddaughter's voice and his or her spouse's voice. For example, a child speaker may be associated with a different voice frequency than an adult speaker. Accordingly, the computer-generated voice selected and/or generated to reiterate speech associated with a child speaker may have a different frequency than a computer-generated voice selected and/or generated to reiterate speech associated with an adult speaker. Likewise, different genders may be associated with different voice frequencies, and the selected and/or generated computer-generated voices may reflect these differences.

In addition to, or as an alternative to voice frequency, the voice patterns associated with the speaker of the original speech may indicate a cadence, accent, or timbre associated with that speaker. A computer-generated voice having at least one of a similar cadence, accent, or timbre may be selected and/or generated to reiterate the speech. For example, two speakers of the same age and/or gender may be associated with similar voice frequencies, but still may sound different than each other. In order to select and/or generate computer-generated voices for these two different speakers, at least one of their cadences, accents, or timbres may be used to select and/or generate two different computer-generated voices.

Utilizing computer-generated voices to reiterate speech captured by the microphone(s) of a hearing device facilitates the ability of the user of the hearing device to comprehend the sounds output by the hearing device. For example, the computer-generated voices may be altered so that they are easier for the user of the hearing device to comprehend. For example, one or more of the volume, tone and/or frequency, word speed, or diction of the computer-generated reiteration may be altered before output by a receiver/speaker of the hearing device. Conversely, if a hearing device were to simply output speech captured by the microphone(s) instead of outputting a computer-generated reiteration of that speech, the speech may not be able to be altered as extensively as a computer-generated reiteration may be. For example, if a hearing device were to simply output speech captured by the microphone(s) instead of outputting a computer-generated reiteration of that speech, the volume of the speech may be able to be amplified. However, other features of the speech, including but not limited to tone and/or frequency, word speed, or diction, may be unalterable. Accordingly, using computer-generated voices to reiterate speech captured by the microphone(s) of a hearing device improves the performance of the hearing device—thereby improving the quality of life of the user of the hearing device.

Figure 7:
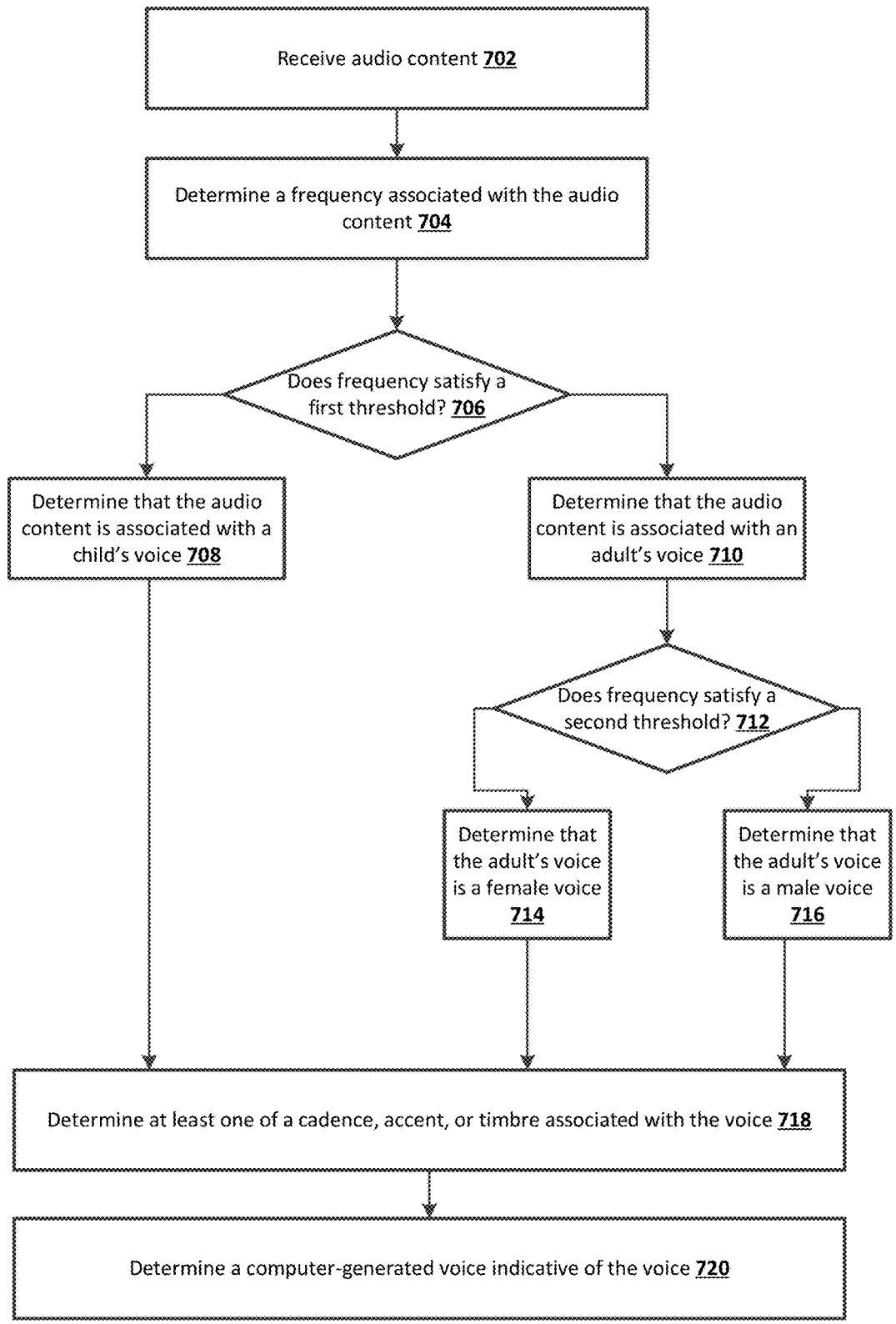
FIG. 7 illustrates an example flow chart.

FIG. 7 depicts a method 700 for selecting and/or generating computer-generated reiterations for output by a hearing device. The method 700 may be performed by the hearing device itself. Additionally, or alternatively, the method 700 may be performed by a device located remote to the hearing device, such as a smartphone that is in communication with the hearing device and configured to generate computer-generated reiterations for output by the hearing device. At 702, audio content may be received. The audio content may be associated with the voice of a particular individual, such as an individual that speaks to the user of the hearing device. For example, the voice may belong to any individual that the user of the hearing device speaks to or listens to. For example, the voice may belong to an individual that is a friend or family member of the user of the hearing device. The audio content may be collected by one or more microphones of a hearing device. For example, the audio content may be captured by a unidirectional and/or an omnidirectional microphone of a hearing device.

The audio content may be indicative of a voice pattern associated with the voice. The voice pattern may indicate one or more of a frequency, a cadence, an accent, or a timbre associated with the voice. A voice frequency (e.g. voice band) may be the range of audio frequencies used for the transmission of speech. Different types of individuals may have different ranges of voice frequencies. For example, children and adults have different ranges of voice frequencies. Similarly, women and men have different ranges of voice frequencies. At 704, the voice pattern may be used to determine a frequency associated with the audio content, such as the voice. As different types of individuals are associated with different ranges of voice frequencies, this determined frequency may be used, at least in part, to determine the type of individual associated with the voice.

At 706, it may be determined whether the frequency satisfies a first threshold. For example, the first threshold may be indicative of the voice frequency range of a child. If the first threshold is indicative of the voice frequency range of a child, the first threshold may be, for example, the average fundamental frequency for a child's voice, such as 300 Hz. The frequency may satisfy the first threshold if it meets, exceeds, or is within a range of the average fundamental frequency for a child's voice. If the frequency satisfies the first threshold, this may indicate that the voice belongs to a child. If the frequency satisfies the first threshold, the method 700 may proceed to step 708. At 708, it may be determined that the voice is associated with a child. Conversely, the frequency may not satisfy the first threshold if the frequency does not meet, exceed, or come within a range of the average fundamental frequency for a child's voice. For example, the frequency may not satisfy the first threshold if the voice belongs to an adult. An average fundamental frequency for an adult voice may range between 125 Hz to 200 Hz. Accordingly, if the first threshold is the average fundamental frequency for a child's voice, such as 300 Hz, the frequency for an adult's voice may not meet, exceed, or come within a range of the first threshold.

If the frequency does not satisfy the first threshold, the method 700 may proceed to step 710. At 710, it may be determined that the voice is associated with an adult, rather than a child. If the voice is associated with an adult, the voice may be associated with either a male adult or a female adult. The average frequency range of a typical adult female is different than the average frequency range of a typical adult male. Accordingly, the determined frequency may be used, at least in part, to determine whether the voice is associated with an adult male or an adult female. At 712, it may be determined whether the frequency satisfies a second threshold. For example, the second threshold may be indicative of the voice frequency range of an adult female. If the second threshold is indicative of the voice frequency range of an adult female, the second threshold may be, for example, the average fundamental frequency for an adult female's voice, such as 200 Hz. The frequency may satisfy the second threshold if it meets, exceeds, or is within a range of the average fundamental frequency for an adult female's voice. If the frequency satisfies the second threshold, this may indicate that the voice belongs to an adult female. At 714, it may be determined that the voice is associated with a female.

Conversely, the frequency may not satisfy the second threshold if the frequency does not meet, exceed, or come within a range of the average fundamental frequency for an adult female's voice. For example, the frequency may not satisfy the first threshold if the voice belongs to an adult male. An average fundamental frequency for an adult male voice may be 125 Hz. Accordingly, if the second threshold is the average fundamental frequency for an adult female's voice, such as 200 Hz, the frequency for an adult male's voice may not meet, exceed, or come within a range of the second threshold. If the frequency does not satisfy the second threshold, the method 700 may proceed to step 716. At 716, it may be determined that the voice is associated with a male.

The determinations made at steps 708, 714, or 716 may be used, at least in part, to determine an appropriate computer-generated voice that may be used to mimic the voice. For example, if it was determined at step 708 that the voice is associated with a child, the computer-generated voice used to mimic the voice may sound like a child. Similarly, if it was determined at step 714 that the voice is associated with a female, the computer-generated voice used to mimic the voice may sound like an adult female. If it was determined at step 716 that the voice is associated with a male, the computer-generated voice used to mimic the voice may sound like an adult male. However, additional information associated with the voice may also be used to determine an appropriate computer-generated voice that may be used to mimic the voice.

At 718, additional information associated with the voice may be determined. The additional information may be determined, for example, using the voice pattern associated with the audio content. The additional information may include, but is not limited to, at least one of a cadence, accent, and/or a timbre associated with the voice. A cadence associated with a voice may be indicative of the way that words flow—it may be indicative of the rhythm in which words are spoken, the words that are emphasized, and/or the up and down movement of pitch throughout sentences. An accent may indicate a pronunciation of a language and may indicate a geographic region associated with the voice. For example, an accent associated with a voice may be a British accent and may indicate that the speaker associated with the voice is from the United Kingdom. As another example, an accent associated with a voice may be a Midwestern accent, and may indicate that the speaker associated with the voice is from the Midwestern United States. A timbre associated with the voice may indicate a perceived sound quality of the voice and may enable a listener to distinguish different voices of the same frequency. For example, a frequency of a voice may be represented by a waveform. Two voices with the same frequency may be represented by a similar waveform. A timbre associated with each voice may be represented by a sub-waveform, and each of the two voices may have different sub-waveforms despite having the same waveform.

At least one of the determined frequency, cadence, accent, and/or timbre associated with the voice may be used to determine a computer-generated voice that best mimics the voice. At 720, a computer-generated voice associated with the voice may be determined. For example, the computer-generated voice may share one or more of a similar frequency, cadence, accent, and/or timbre as the voice. The computer-generated voice may be used, such as by a hearing device, to reiterate speech, such as speech that was originally spoken by the voice. The computer-generated reiteration of the speech may be output to a user of the hearing device.

As described above, the computer-generated voices may be altered, before output, in order to facilitate the ability of the user of the hearing device to comprehend the computer-generated voice. For example, the computer-generated voice may be altered so that it easier for the user of the hearing device to comprehend. For example, one or more of the volume, tone and/or frequency, word speed, or diction of the computer-generated reiteration may be altered before output by a receiver/speaker of the hearing device. Accordingly, using computer-generated voices to reiterate speech captured by the microphone(s) of a hearing device improves the performance of the hearing device—thereby improving the quality of life of the user of the hearing device.

As described above, computer-generated reiterations output by a hearing device, such as the hearing device 200 and/or the hearing device 302, may be generated, at least in part, using deep fake technology. As also described above, deep fakes are fake videos or audio recordings that look and sound just like the real thing. For example, a deep fake may be a video or audio recording that looks and/or sounds just like a celebrity—but is not actually that celebrity. To create deep fakes, two machine learning (ML) models may be utilized. A first ML model may be trained on a data set and then be used to create video and/or audio forgeries, while the other ML model attempts to detect the forgeries. The first ML model creates fakes until the other ML model can no longer detect the forgery. The larger the set of training data, the easier it is for the first ML model to create a believable deep fake.

If the computer-generated voices are generated utilizing, at least in part, deep fake technology, the computer-generated voice associated with a voice may improve (e.g. sound more like the original voice) each time audio content associated with this voice is captured. A first ML model may be trained on a data set, which may include audio content associated with a voice, captured by the microphone(s) of a hearing device. The audio content may be stored in a database accessible to the remote devices configured to generate the computer-generated voices and/or accessible to the hearing device itself. For example, the audio content may be stored in a database at a remote cloud network.

If this is the first time that audio content associated with the voice has been captured by the microphone(s) of the hearing device (e.g. this is the first time the user of the hearing device has conversed with a particular individual), the training set may be small, and the first ML model may not be able to create a believable "fake" voice to mimic the individual's actual voice. Rather, the first ML model may select a generic female or male voice to be the first computer-generated iteration "deep fake" of the voice. After the first iteration, the second ML model may be able to easily detect that the first computer-generated iteration is indeed a "fake" voice.

As audio content associated with this voice continue to be captured by the microphone(s) of the hearing device, such as over the course of days, weeks, months, years, or any other time period, the training set on which the first ML model is trained may be increased. As the training set grows large enough, the first ML model may be able to generate a "fake" computer-generated voice that sounds more and more like the original voice. Eventually, enough audio content associated with the voice may be captured so that the computer-generated voice sounds nearly identical to the original voice. For example, the second ML model may no longer be able to detect that the computer-generated voice is a "fake" voice.

This utilization of deep fake technology may be particularly helpful when generating computer-generated voices for individuals that the user of the hearing device interacts with frequently. For example, the user of the hearing device may frequently interact with or converse with a particular friend or family member, such as his or her spouse. Due to this frequent interaction, enough audio content associated with these individuals' voices may eventually be captured so that later iterations of the computer-generated voices sound nearly identical to the original voices. This deep fake technology may be utilized only for a portion of speech captured by the microphone(s) of the hearing device (such as speech associated with individuals who frequently interact with the user of the hearing aid), whereas other speech and/or sounds captured by the microphone(s) of the hearing aid may be generated using other techniques, such as by selecting a pre-programmed voice from a database.

Figure 8:
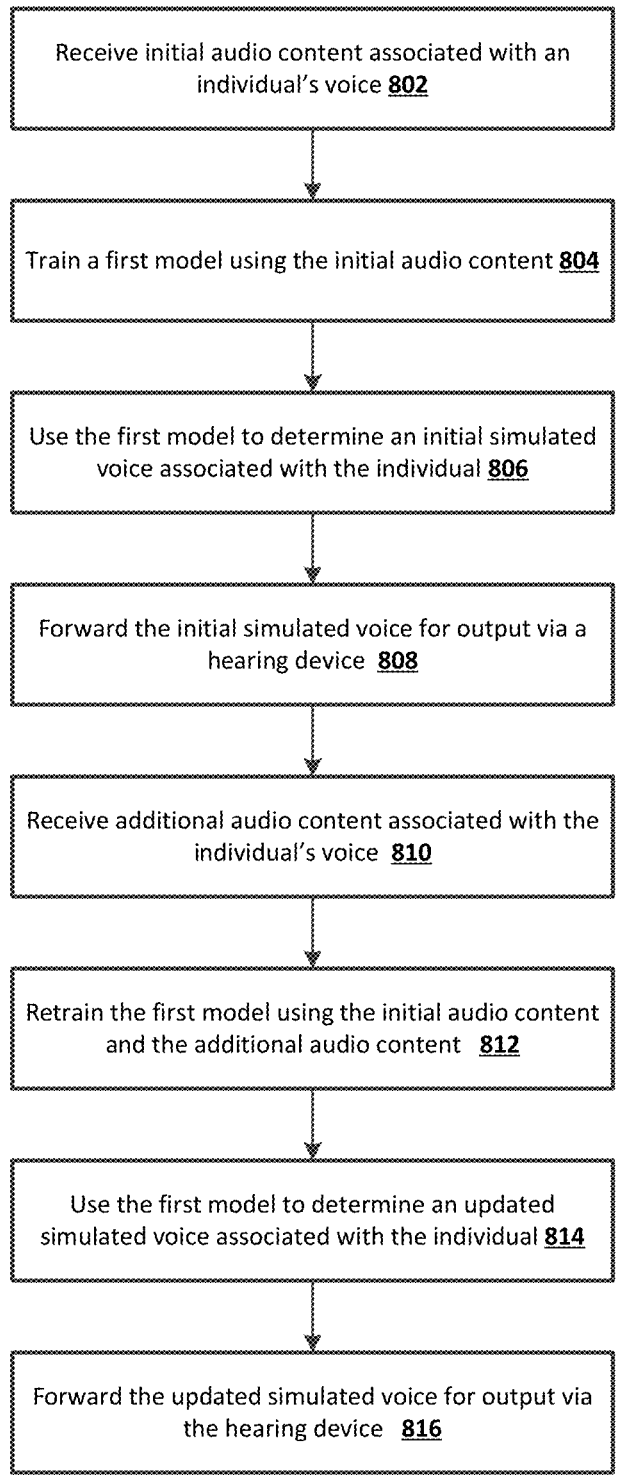
FIG. 8 illustrates an example flow chart.

FIG. 8 depicts a method 800 for utilizing deep fake technology to generate computer-generated reiterations for output by a hearing device. The method 800 may be performed by the hearing device itself. Additionally, or alternatively, the method 800 may be performed by a device located remote to the hearing device, such as a smartphone that is in communication with the hearing device and configured to generate computer-generated reiterations for output by the hearing device. At 802, audio content may be received. The audio content may be captured by one or more microphone(s) of a hearing device during a conversation between the user of the hearing device and an individual. The individual may be any individual that the user of the hearing device speaks to or listens to. For example, the individual may be a friend or family member of the user of the hearing device.

The audio content may indicate a voice pattern associated with the individual. For example, the data may indicate a frequency associated with the individual's voice. As described above, the frequency of a voice may indicate whether the speaker is a child or an adult, and/or whether the speaker is male or female. For example, a child speaker may be associated with a different voice frequency than an adult speaker and a female speaker may be associated with a different voice frequency than a male speaker. In addition to, or as an alternative to voice frequency, the data may indicate a cadence, accent, or timbre associated with the speaker. For example, two speakers of the same age and/or gender may be associated with similar voice frequencies, but still may sound different than each other. The two speakers may sound different, despite having similar voice frequencies, due to at least one of their cadences, accents, or timbres.

An initial voice may be generated based on the voice pattern associated with the individual. The initial voice may be a computer-generated voice that aims to resemble the individual's actual voice. The initial voice may be generated based on at least one of the frequency, cadence, accent, or timbre associated with the individual's voice pattern. For example, the initial voice may be generated using a model, such as a machine learning model, that has been trained on the voice pattern data associated with the individual. At 804, a first model may be trained using the voice pattern data associated with the speaker. The first model may be trained to generate "fake" voices that sound like the individual's actual voice. For example, the first model may be trained to generate "fake" voices that sound like the individual's actual voice using at least one of the frequency, cadence, accent, or timbre associated with the individual's voice pattern.

The trained model may be used to generate the "fake" voice that sounds like the individual's actual voice. At 806, the first model may be used to determine an initial simulated voice (e.g. fake voice) associated with the individual. As discussed above, this initial simulated voice may be a generic female or male voice (depending on the gender of the original speaker). For example, if the trained model determines, based on a voice frequency associated with the voice pattern, that the individual is a female, the initial simulated voice may be a generic female voice. This initial simulated voice may not sound very similar to the individual's actual voice. It may have little in common with the individual's actual voice aside from the correct frequency. At this stage, a second ML model may be able to easily detect that the initial simulated voice is indeed a "fake" voice.

Although the initial simulated voice may not sound similar to the individual's actual voice, it may still be used to reiterate speech that may be output by a hearing device. At 808, the initial simulated voice may be forwarded for output via a hearing device. The hearing device may be configured to prioritize output of sounds captured by a particular microphone and/or be configured to alter the reiteration (e.g. change the volume, speed, tone/pitch, or diction) before output.

As audio content associated with the individual's voice continues to be captured by the microphone(s) of the hearing device, such as over the course of days, weeks, months, years, or any other time period, the training set on which the model is trained may be increased. At 810, additional audio content associated with the individual's voice may be received. The additional audio content associated with the individual's voice may be captured by one or more microphone(s) of a hearing device, such as the hearing device 200 and/or the hearing device 302. The additional audio content associated with the individual's voice may be captured by one or more microphone(s) of a hearing device during one or more additional conversations between the user of the hearing device and the individual. The additional audio content associated with the individual's voice may indicate a voice pattern associated with the individual, such as one or more of a frequency, cadence, accent, or timbre associated with the individual.

As additional data continues to be received, the training set for the first model may continue to grow. If the training set grows large enough, the first model may be able to generate "fake" computer-generated voices that sound more and more like the individual's actual voice. At 812, the first model may be retrained using the first data and the additional data. Eventually, enough voice data associated with the individual's voice may be captured so that the first model may be able to generate a "fake" voice that sounds nearly identical to the individual's actual voice. At 814, the first model may be used to determine an updated simulated voice associated with the individual. The updated simulated voice may sound more similar to the individual's actual voice than the initial simulated voice did, due at least in part to the increased training set. For example, the updated simulated voice may no longer be a generic male or female voice. Rather, the updated simulated voice may share other similarities with the individual's actual voice, such as a cadence, accent, or timbre. At this stage, the second ML model may no longer be able to detect or may have more difficulty in detecting that the updated simulated voice is indeed a "fake" voice.

The updated simulated voice may be used to reiterate speech for output by the hearing device. At 816, the updated simulated voice may be forwarded for output via the hearing device. The user of the hearing device may hear the updated simulated voice reiterating words spoken by the individual. The user may find that the updated simulated voice sounds nearly identical to the individual's actual voice. Steps 810-816 may continue to repeat as the user of the hearing device continues to interact with the individual. With each iteration, the updated simulated voice may begin to sound more and more like the individual's actual voice.

Figure 9:
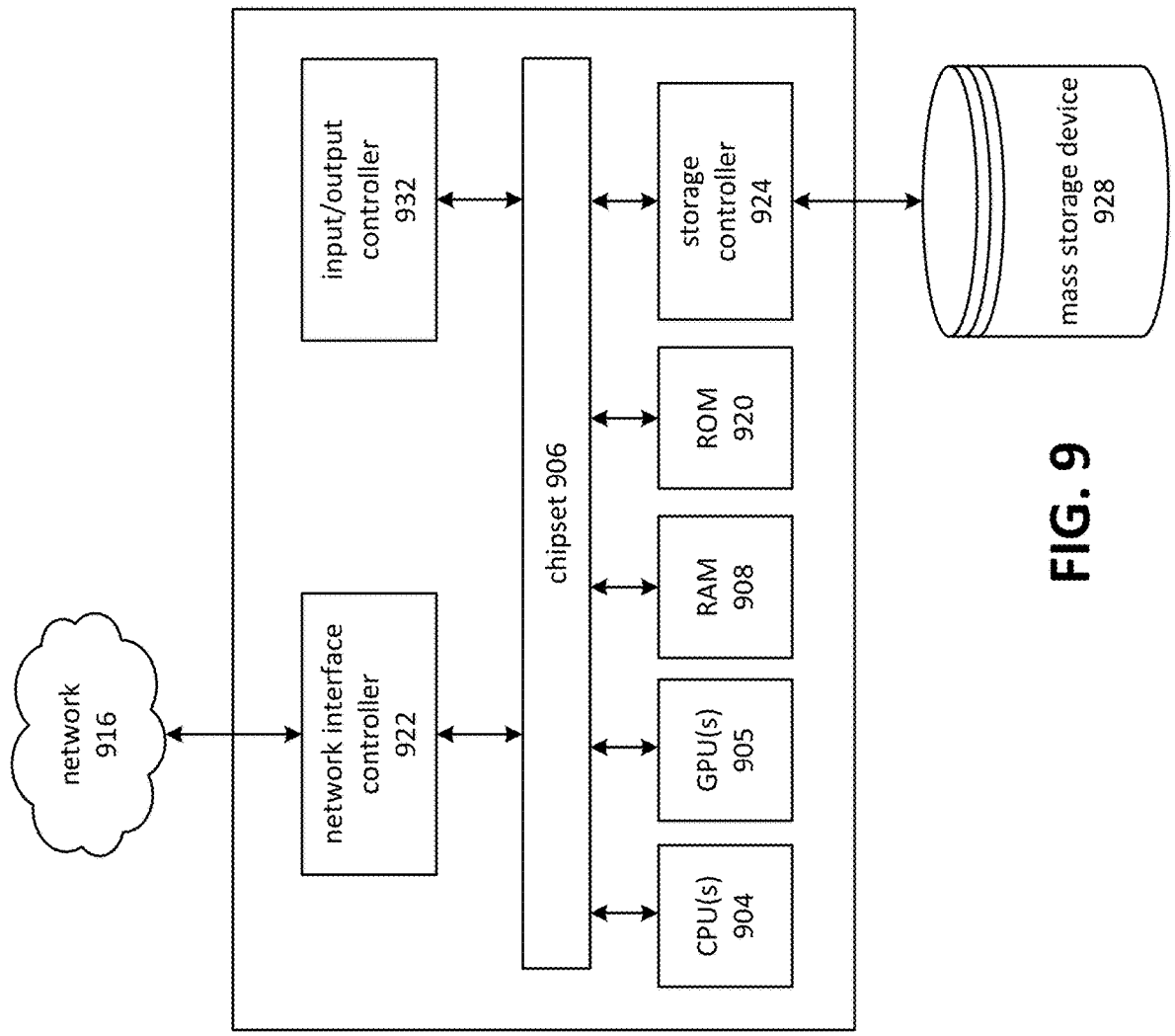
FIG. 9 illustrates an example computing device.

FIG. 9 depicts an example computing device 900 that may be used to implement any of the various devices or entities illustrated in FIGS. 2-3, including, for example, the hearing device 200, the hearing device 302, and/or the remote devices 314, 316. That is, the computing device 900 shown in FIG. 9 may be any smartphone, server computer, workstation, access point, router, gateway, tablet computer, laptop computer, notebook computer, desktop computer, personal computer, network appliance, PDA, e-reader, user equipment (UE), mobile station, fixed or mobile subscriber unit, pager, wireless sensor, consumer electronics, or other computing device, and may be utilized to execute any aspects of the methods and apparatus described herein, such as to implement any of the apparatus of FIGS. 2-3 or the methods described in relation to FIGS. 4-8.

The computing device 900 may include a baseboard, or "motherboard," which is a printed circuit board to which a multitude of components or devices may be connected by way of a system bus or other electrical communication paths. One or more central processing units (CPUs or "processors") 904 may operate in conjunction with a chipset 906. The CPU(s) 904 may be standard programmable processors that perform arithmetic and logical operations necessary for the operation of the computing device 900.

The CPU(s) 904 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 904 may be augmented with or replaced by other processing units, such as GPU(s) 905. The GPU(s) 905 may comprise processing units specialized for but not necessarily limited to highly parallel computations, such as graphics and other visualization-related processing.

A chipset 906 may provide an interface between the CPU(s) 904 and the remainder of the components and devices on the baseboard. The chipset 906 may provide an interface to a random access memory (RAM) 908 used as the main memory in the computing device 900. The chipset 906 may provide an interface to a computer-readable storage medium, such as a read-only memory (ROM) 920 or non-volatile RAM (NVRAM) (not shown), for storing basic routines that may help to start up the computing device 900 and to transfer information between the various components and devices. ROM 920 or NVRAM may also store other software components necessary for the operation of the computing device 900 in accordance with the aspects described herein.

The computing device 900 may operate in a networked environment using logical connections to remote computing nodes and computer systems of the communications network 300. The chipset 906 may include functionality for providing network connectivity through a network interface controller (NIC) 922. A NIC 922 may be capable of connecting the computing device 900 to other computing nodes over the communications network 300. It should be appreciated that multiple NICs 922 may be present in the computing device 900, connecting the computing device to other types of networks and remote computer systems. The NIC may be configured to implement a wired local area network technology, such as IEEE 802.3 ("Ethernet") or the like. The NIC may also comprise any suitable wireless network interface controller capable of wirelessly connecting and communicating with other devices or computing nodes on the communications network 300. For example, the NIC 922 may operate in accordance with any of a variety of wireless communication protocols, including for example, the IEEE 802.11 ("Wi-Fi") protocol, the IEEE 802.16 or 802.20 ("WiMAX") protocols, the IEEE 802.15.4a ("Zigbee") protocol, the 802.15.3c ("UWB") protocol, or the like.

The computing device 900 may be connected to a mass storage device 928 that provides non-volatile storage (i.e., memory) for the computer. The mass storage device 928 may store system programs, application programs, other program modules, and data, which have been described in greater detail herein. The mass storage device 928 may be connected to the computing device 900 through a storage controller 924 connected to the chipset 906. The mass storage device 928 may consist of one or more physical storage units. A storage controller 924 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 900 may store data on a mass storage device 928 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 928 is characterized as primary or secondary storage and the like.

For example, the computing device 900 may store information to the mass storage device 928 by issuing instructions through a storage controller 924 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 900 may read information from the mass storage device 928 by detecting the physical states or characteristics of one or more particular locations within the physical storage units.

In addition to the mass storage device 928 described herein, the computing device 900 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 900.

By way of example and not limitation, computer-readable storage media may include volatile and non-volatile, non-transitory computer-readable storage media, and removable and non-removable media implemented in any method or technology. However, as used herein, the term computer-readable storage media does not encompass transitory computer-readable storage media, such as signals. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other non-transitory medium that may be used to store the desired information in a non-transitory fashion.

A mass storage device, such as the mass storage device 928 depicted in FIG. 9, may store an operating system utilized to control the operation of the computing device 900. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 928 may store other system or application programs and data utilized by the computing device 900.

The mass storage device 928 or other computer-readable storage media may also be encoded with computer-executable instructions, which, when loaded into the computing device 900, transforms the computing device from a general-purpose computing system into a special-purpose computer capable of implementing the aspects described herein. These computer-executable instructions transform the computing device 900 by specifying how the CPU(s) 904 transition between states, as described herein. The computing device 900 may have access to computer-readable storage media storing computer-executable instructions, which, when executed by the computing device 900, may perform the methods described in relation to FIGS. 4-8.

A computing device, such as the computing device 900 depicted in FIG. 9, may also include an input/output controller 932 for receiving and processing input from a number of input devices, such as a keyboard, a mouse, a touchpad, a touch screen, an electronic stylus, or other type of input device. Similarly, an input/output controller 932 may provide output to a display, such as a computer monitor, a flat-panel display, a digital projector, a printer, a plotter, or other type of output device. It will be appreciated that the computing device 900 may not include all of the components shown in FIG. 9, may include other components that are not explicitly shown in FIG. 9, or may utilize an architecture completely different than that shown in FIG. 9.

As described herein, a computing device may be a physical computing device, such as the computing device 900 of FIG. 9. A computing device may also include a virtual machine host process and one or more virtual machine instances. Computer-executable instructions may be executed by the physical hardware of a computing device indirectly through interpretation and/or execution of instructions stored and executed in the context of a virtual machine.

One skilled in the art will appreciate that the systems and methods disclosed herein may be implemented via a computing device that may comprise, but are not limited to, one or more processors, a system memory, and a system bus that couples various system components including the processor to the system memory. In the case of multiple processors, the system may utilize parallel computing.

For purposes of illustration, application programs and other executable program components such as the operating system are illustrated herein as discrete blocks, although it is recognized that such programs and components reside at various times in different storage components of the computing device, and are executed by the data processor(s) of the computer. An implementation of service software may be stored on or transmitted across some form of computer-readable media. Any of the disclosed methods may be performed by computer-readable instructions embodied on computer-readable media. Computer-readable media may be any available media that may be accessed by a computer. By way of example and not meant to be limiting, computer-readable media may comprise "computer storage media" and "communications media." "Computer storage media" comprise volatile and non-volatile, removable and non-removable media implemented in any methods or technology for storage of information such as computer-readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer. Application programs and the like and/or storage media may be implemented, at least in part, at a remote system.

As used in the specification and the appended claims, the singular forms "a," "an" and "the" include plural referents unless the context clearly dictates otherwise. Ranges may be expressed herein as from "about" one particular value, and/or to "about" another particular value. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect.

It will be apparent to those skilled in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   receiving audio content captured by a plurality of microphones associated with a hearing device;
   determining that a first portion of the audio content is associated with a first microphone of the plurality of microphones;
   generating, based at least on the first portion being associated with the first microphone, audio indicative of the first portion; and
   sending, to the hearing device for output, the audio indicative of the first portion.

2. The method of claim 1, wherein the first microphone is a unidirectional microphone configured to capture audio content from a direction, and wherein determining that the first portion is associated with the first microphone comprises:
   determining that the first portion originated from the direction.

3. The method of claim 1, further comprising:
   determining that a second portion of the audio content is associated with a second microphone of the plurality of microphones;
   generating, based at least on the second portion being associated with the second microphone, audio indicative of the second portion, the audio indicative of the second portion having a different characteristic than the audio indicative of the first portion; and
   sending, to the hearing device for output, the audio indicative of the second portion.

4. The method of claim 3, wherein the audio indicative of the second portion has at least one of a different frequency, timbre, or amplitude than the audio indicative of the first portion.

5. The method of claim 3, wherein the second microphone is an omnidirectional microphone, and wherein determining that the second portion is associated with the second microphone comprises:
   determining that the second portion originated from a different direction than the first portion.

6. The method of claim 3, wherein determining that the second portion is associated with the second microphone comprises determining that the second portion comprises background noise.

7. The method of claim 1, wherein the first portion is indicative of speech, and wherein generating audio indicative of the first portion comprises:
   generating a reiteration of the speech.

8. The method of claim 1, wherein the hearing device comprises a speaker, and wherein sending, to the hearing device for output, the audio indicative of the first portion comprises:
   sending, to the hearing device for output via the speaker, the audio indicative of the first portion.

9. A device comprising:
   one or more processors; and
   memory storing instructions that, when executed by the one or more processors cause the device to:
     receive audio content captured by a plurality of microphones associated with a hearing device;
     determine that a first portion of the audio content is associated with a first microphone of the plurality of microphones;
     generate, based at least on the first portion being associated with the first microphone, audio indicative of the first portion; and
     send, to the hearing device for output, the audio indicative of the first portion.

10. The device of claim 9, wherein the first microphone is a unidirectional microphone configured to capture audio content from a direction, and wherein the instructions that, when executed by the one or more processors, cause the device to determine that the first portion is associated with the first microphone cause the device to determine that the first portion originated from the direction.

11. The device of claim 9, wherein the instructions, when executed by the one or more processors, further cause the device to:
  determine that a second portion of the audio content is associated with a second microphone of the plurality of microphones;
  generate, based at least on the second portion being associated with the second microphone, audio indicative of the second portion, the audio indicative of the second portion having a different characteristic than the audio indicative of the first portion; and
  send, to the hearing device for output, the audio indicative of the second portion.

12. The device of claim 11, wherein the audio indicative of the second portion has at least one of a different frequency, timbre, or amplitude than the audio indicative of the first portion.

13. The device of claim 11, wherein the second microphone is an omnidirectional microphone, and wherein the instructions that, when executed by the one or more processors, cause the device to determine that the second portion is associated with the second microphone cause the device to determine that the second portion originated from a different direction than the first portion.

14. The device of claim 11, wherein the instructions that, when executed by the one or more processors, cause the device to determine that the second portion is associated with the second microphone cause the device to determine that the second portion comprises background noise.

15. The device of claim 9, wherein the first portion is indicative of speech, and wherein the instructions that, when executed by the one or more processors, cause the device to generate audio indicative of the first portion cause the device to generate a reiteration of the speech.

16. The device of claim 9, wherein the hearing device comprises a speaker, and wherein the instructions that, when executed by the one or more processors, cause the device to send, to the hearing device for output, the audio indicative of the first portion cause the device to send, to the hearing device for output via the speaker, the audio indicative of the first portion.

17. A non-transitory computer-readable medium storing instructions that, when executed, cause:
  receiving audio content captured by a plurality of microphones associated with a hearing device;
  determining that a first portion of the audio content is associated with a first microphone of the plurality of microphones;
  generating, based at least on the first portion being associated with the first microphone, audio indicative of the first portion; and
  sending, to the hearing device for output, the audio indicative of the first portion.

18. The non-transitory computer-readable medium of claim 17, wherein the first microphone is a unidirectional microphone configured to capture audio content from a direction, and wherein the instructions that cause determining that the first portion is associated with the first microphone cause determining that the first portion originated from the direction.

19. The non-transitory computer-readable medium of claim 17, wherein the instructions, when executed, further cause:
  determining that a second portion of the audio content is associated with a second microphone of the plurality of microphones;
  generating, based at least on the second portion being associated with the second microphone, audio indicative of the second portion, the audio indicative of the second portion having a different characteristic than the audio indicative of the first portion; and
  sending, to the hearing device for output, the audio indicative of the second portion.

20. The non-transitory computer-readable medium of claim 19, wherein the audio indicative of the second portion has at least one of a different frequency, timbre, or amplitude than the audio indicative of the first portion.

21. The non-transitory computer-readable medium of claim 19, wherein the second microphone is an omnidirectional microphone, and wherein the instructions that cause determining that the second portion is associated with the second microphone cause determining that the second portion originated from a different direction than the first portion.

22. The non-transitory computer-readable medium of claim 19, wherein the instructions that cause determining that the second portion is associated with the second microphone cause determining that the second portion comprises background noise.

23. The non-transitory computer-readable medium of claim 17, wherein the first portion is indicative of speech, and wherein the instructions that cause generating audio indicative of the first portion cause generating a reiteration of the speech.

24. The non-transitory computer-readable medium of claim 17, wherein the hearing device comprises a speaker, and wherein the instructions that cause sending, to the hearing device for output, the audio indicative of the first portion cause sending, to the hearing device for output via the speaker, the audio indicative of the first portion.

\* \* \* \* \*